US010819895B2

(12) United States Patent
Kamino

(10) Patent No.: US 10,819,895 B2
(45) Date of Patent: Oct. 27, 2020

(54) IMAGING CONTROL UNIT, IMAGING APPARATUS, AND IMAGING CONTROL METHOD

(71) Applicant: SONY CORPORATION, Tokyo (JP)

(72) Inventor: Kousuke Kamino, Tokyo (JP)

(73) Assignee: SONY CORPORATION, Tokyo (JP)

( * ) Notice: Subject to any disclaimer, the term of this patent is extended or adjusted under 35 U.S.C. 154(b) by 22 days.

(21) Appl. No.: 16/077,648

(22) PCT Filed: Jan. 11, 2017

(86) PCT No.: PCT/JP2017/000611
§ 371 (c)(1),
(2) Date: Aug. 13, 2018

(87) PCT Pub. No.: WO2017/149937
PCT Pub. Date: Sep. 8, 2017

(65) Prior Publication Data
US 2019/0045098 A1    Feb. 7, 2019

(30) Foreign Application Priority Data
Mar. 2, 2016    (JP) .................................. 2016-039867

(51) Int. Cl.
*H04N 5/232*    (2006.01)
*H04N 5/345*    (2011.01)
(Continued)

(52) U.S. Cl.
CPC ............... *H04N 5/232* (2013.01); *G06T 1/00* (2013.01); *H04N 5/341* (2013.01); *H04N 5/345* (2013.01);
(Continued)

(58) Field of Classification Search
CPC ........ H04N 5/232; H04N 5/341; H04N 5/374; H04N 5/37455; H04N 5/378; H04N 5/345; G06T 1/00
See application file for complete search history.

(56) References Cited

U.S. PATENT DOCUMENTS

| | | | |
|---|---|---|---|
| 2004/0042791 A1* | 3/2004 | Suekane | H04N 5/23293 396/661 |
| 2007/0181687 A1* | 8/2007 | Fukushima | H04N 5/23212 235/454 |

(Continued)

FOREIGN PATENT DOCUMENTS

| | | |
|---|---|---|
| CN | 103297724 A | 9/2013 |
| JP | 2000-032318 A | 1/2000 |

(Continued)

OTHER PUBLICATIONS

International Search Report and Written Opinion of PCT Application No. PCT/JP2017/000611, dated Mar. 14, 2017, 11 pages of ISRWO.

*Primary Examiner* — Lin Ye
*Assistant Examiner* — Tuan H Le
(74) *Attorney, Agent, or Firm* — Chip Law Group

(57) ABSTRACT

An imaging control unit of the disclosure includes a first converter that performs analog-digital conversion operation in a first conversion period on the basis of a pixel signal supplied from a first pixel included in a first region of an imaging section, a second converter that performs the analog-digital conversion operation in a second conversion period on a basis of a pixel signal supplied from a second pixel included in a second region that is different from the first region, of the imaging section, and a controller that controls a time length of the first conversion period to become shorter than a time length of the second conversion period.

14 Claims, 21 Drawing Sheets

(51) Int. Cl.
  *H04N 5/378* (2011.01)
  *H04N 5/374* (2011.01)
  *H04N 5/341* (2011.01)
  *G06T 1/00* (2006.01)
  *H04N 5/3745* (2011.01)

(52) U.S. Cl.
  CPC ............ *H04N 5/374* (2013.01); *H04N 5/378* (2013.01); *H04N 5/37455* (2013.01)

(56) References Cited

U.S. PATENT DOCUMENTS

| | | |
|---|---|---|
| 2013/0229543 A1 | 9/2013 | Hashimoto et al. |
| 2016/0344969 A1* | 11/2016 | Furukawa ............... H03M 1/56 |
| 2016/0381313 A1 | 12/2016 | Murata et al. |

FOREIGN PATENT DOCUMENTS

| | | |
|---|---|---|
| JP | 2013-211832 A | 10/2013 |
| JP | 2015-111762 A | 6/2015 |
| WO | 2015/083674 A1 | 6/2015 |

\* cited by examiner

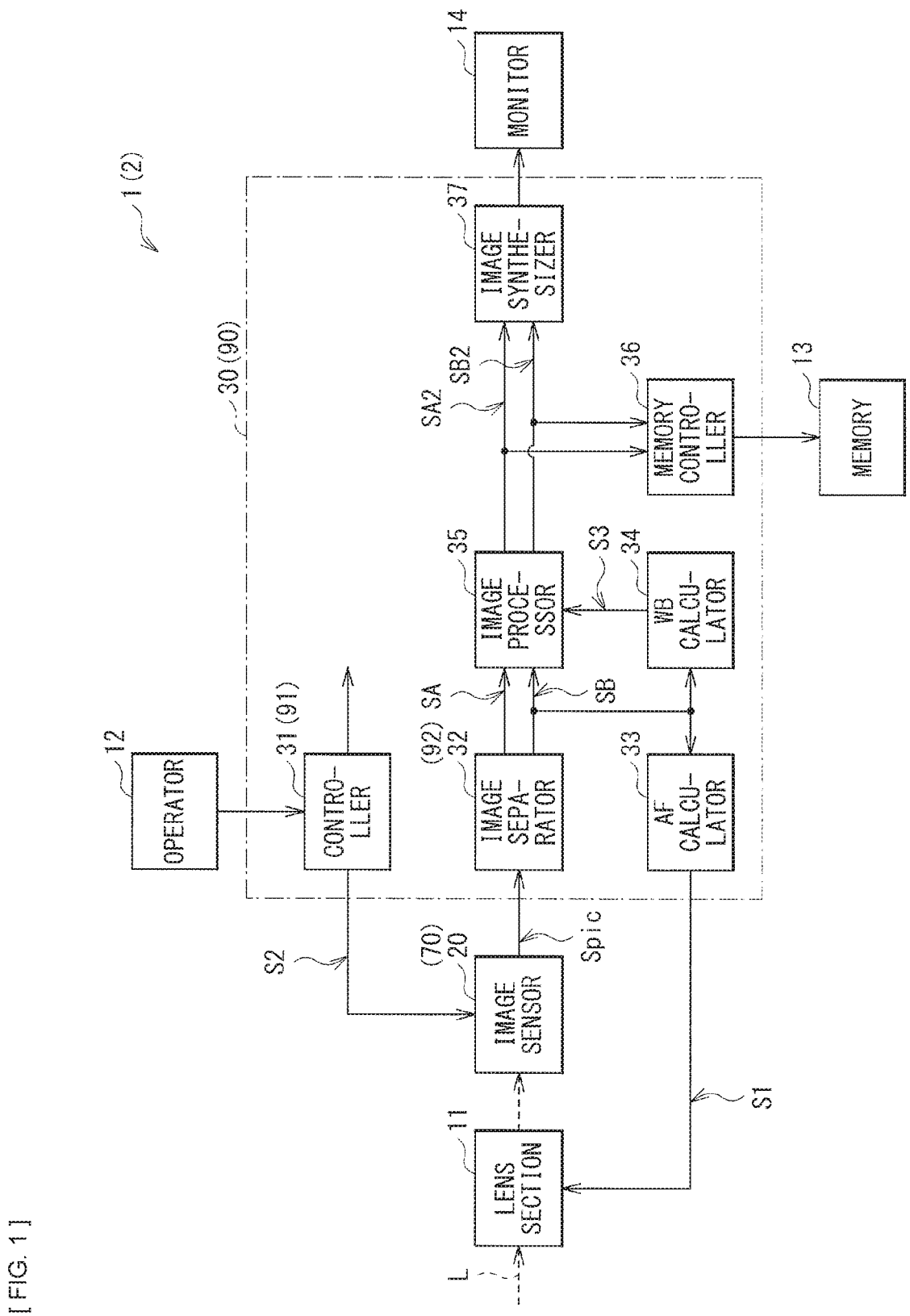
[FIG. 1]

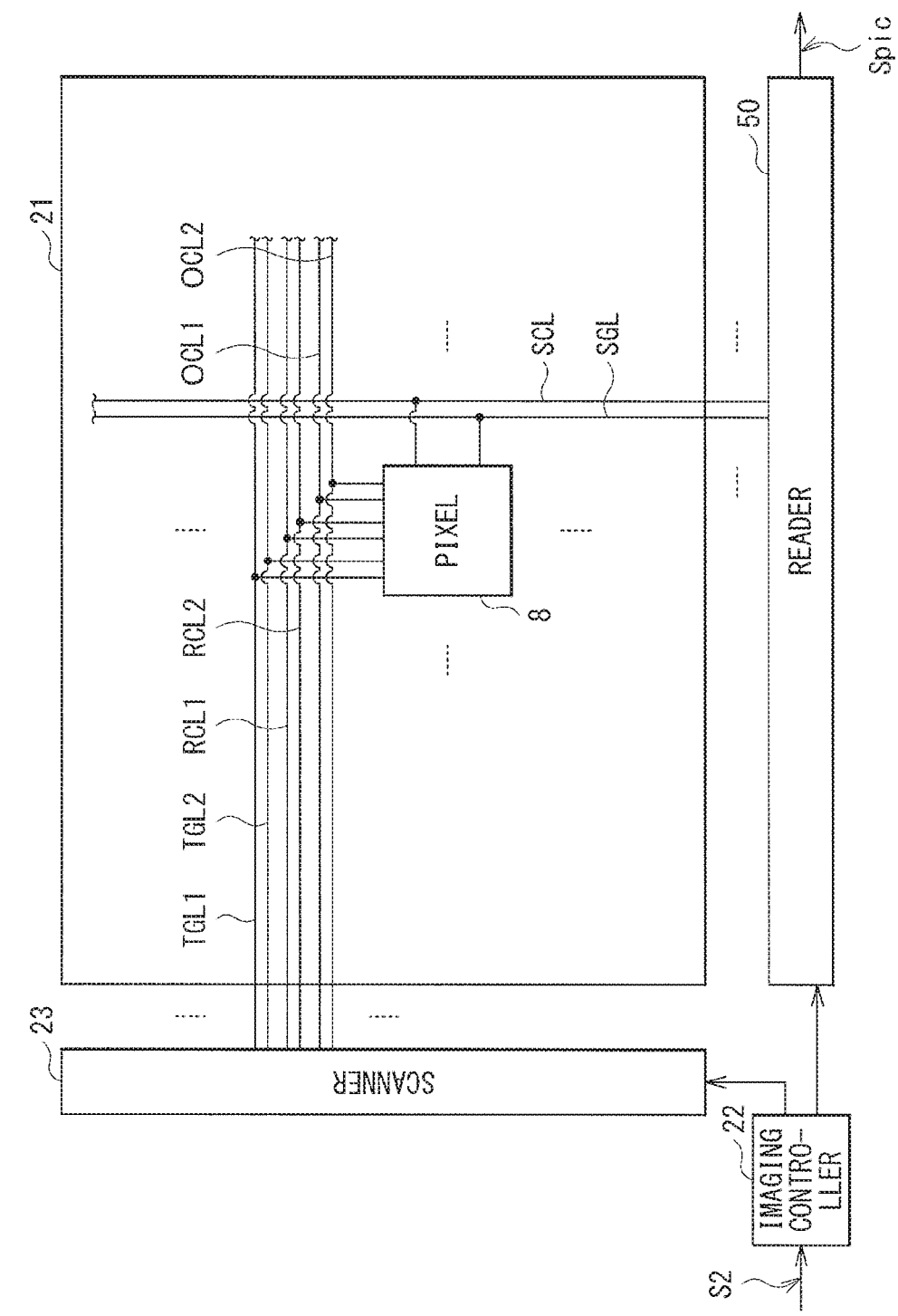

[ FIG. 3 ]
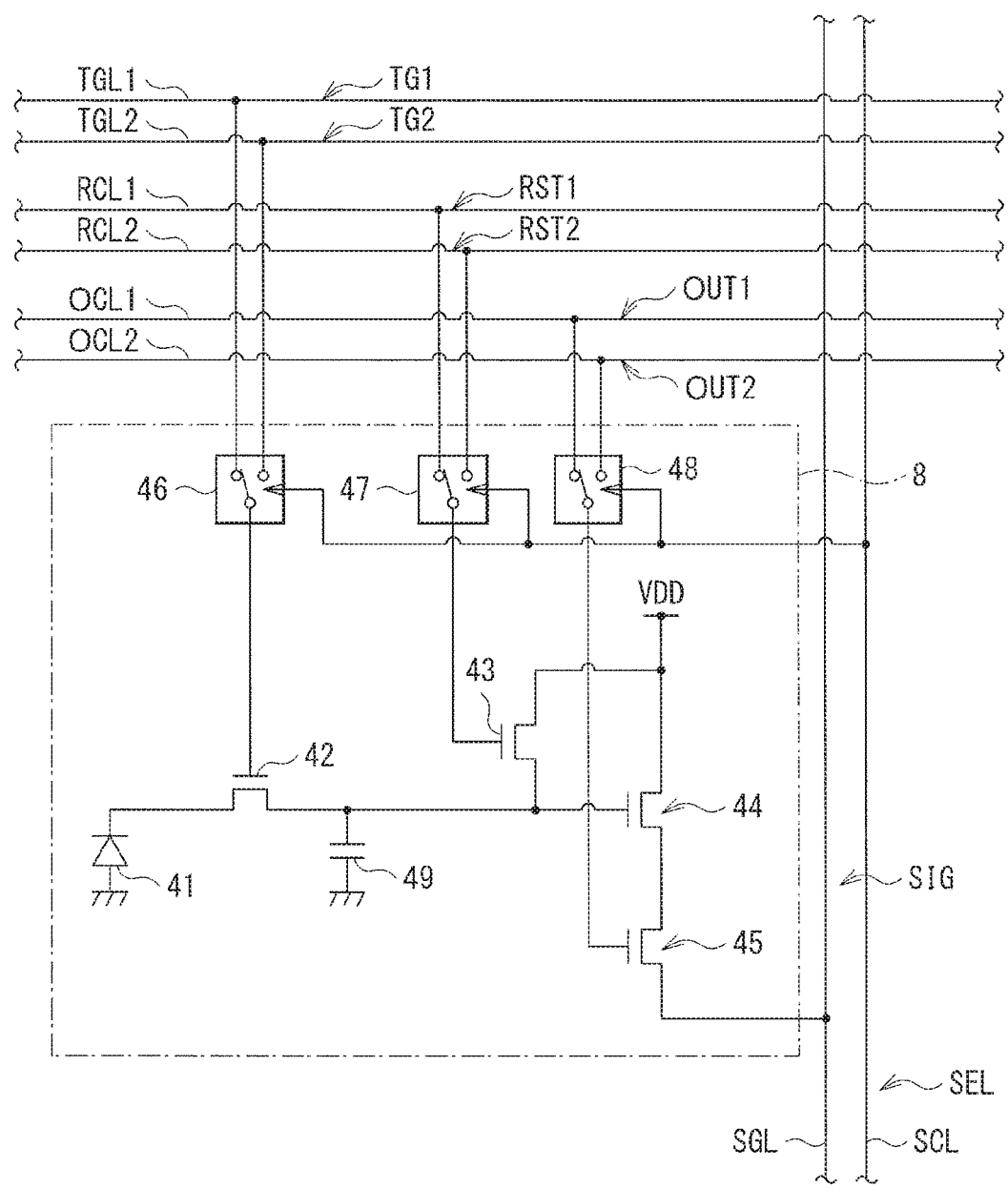

[FIG. 4]
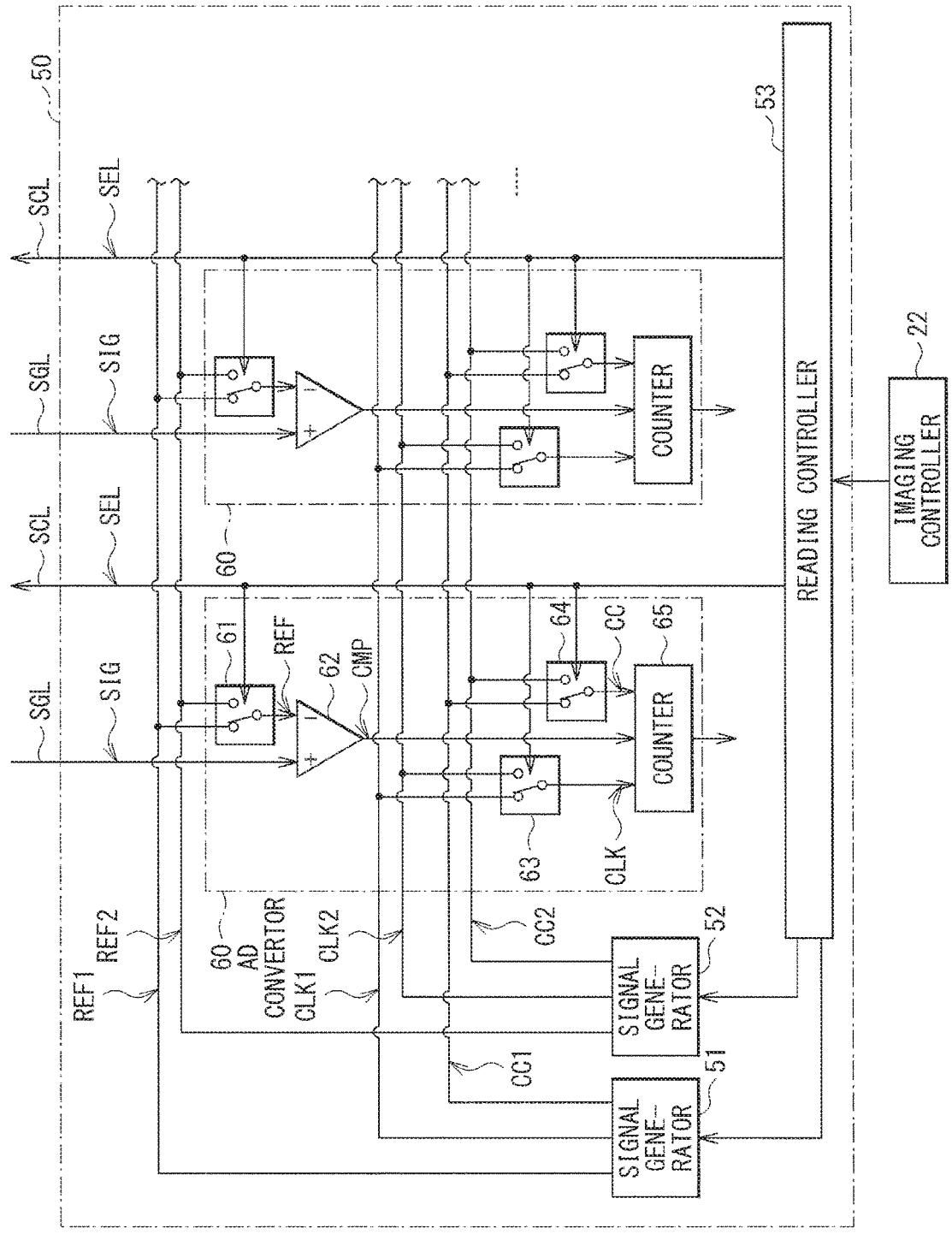

[ FIG. 5 ]
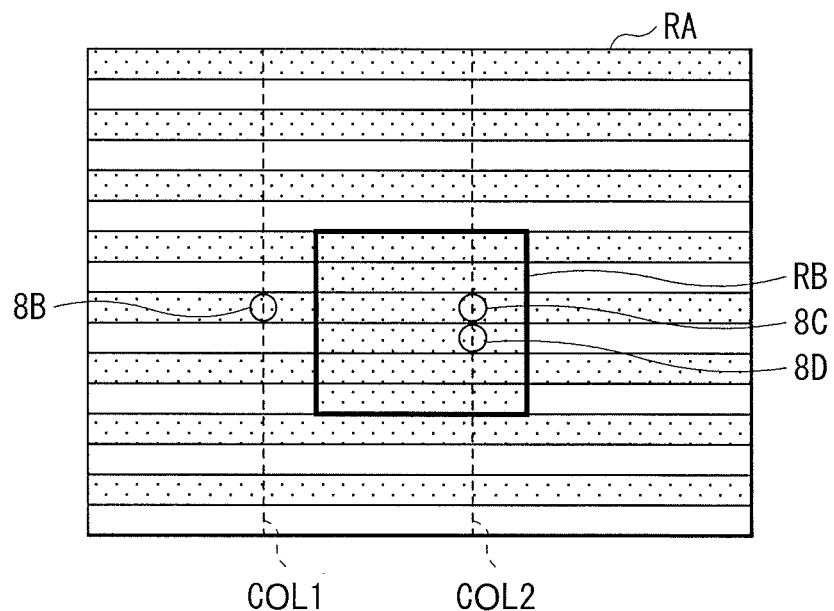
[ FIG. 6A ]
[ FIG. 6B ]
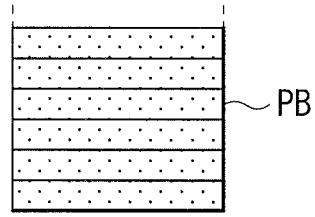

[ FIG. 7 ]
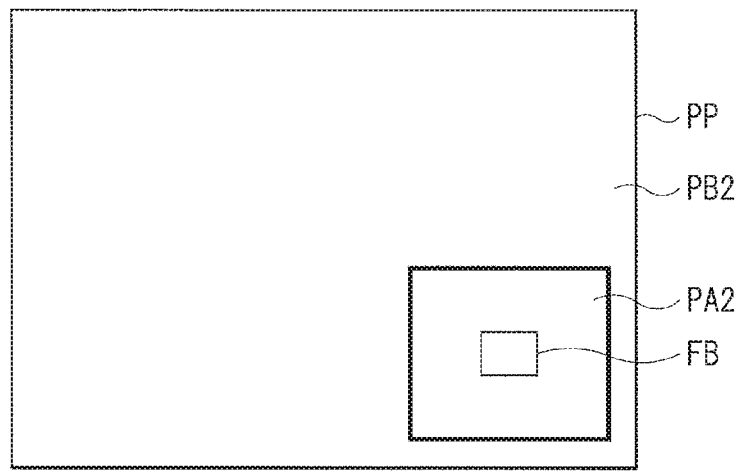
[ FIG. 8 ]
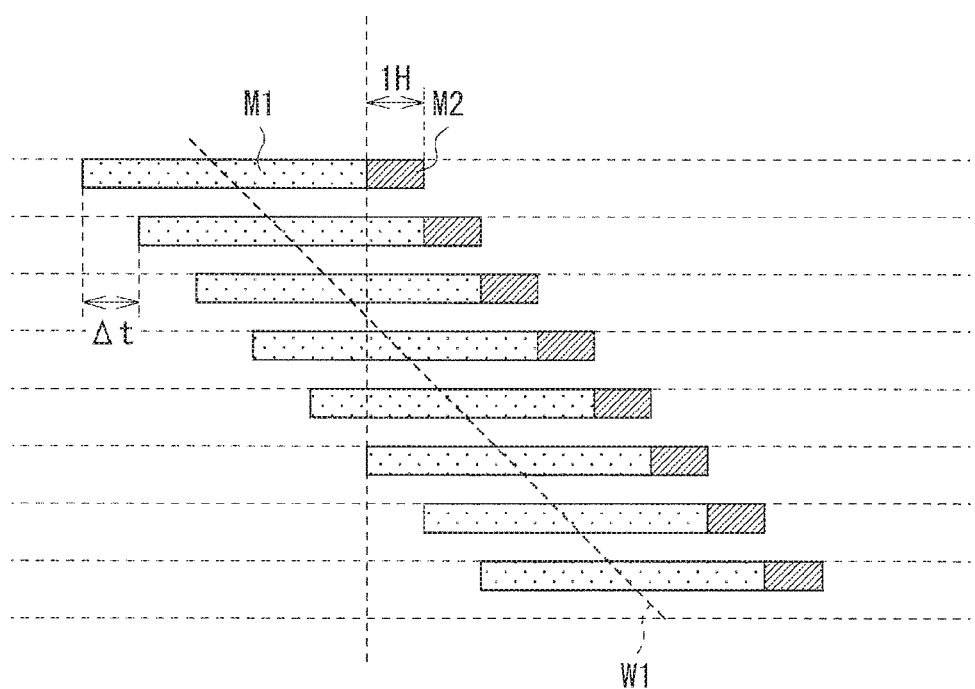

[FIG. 9]
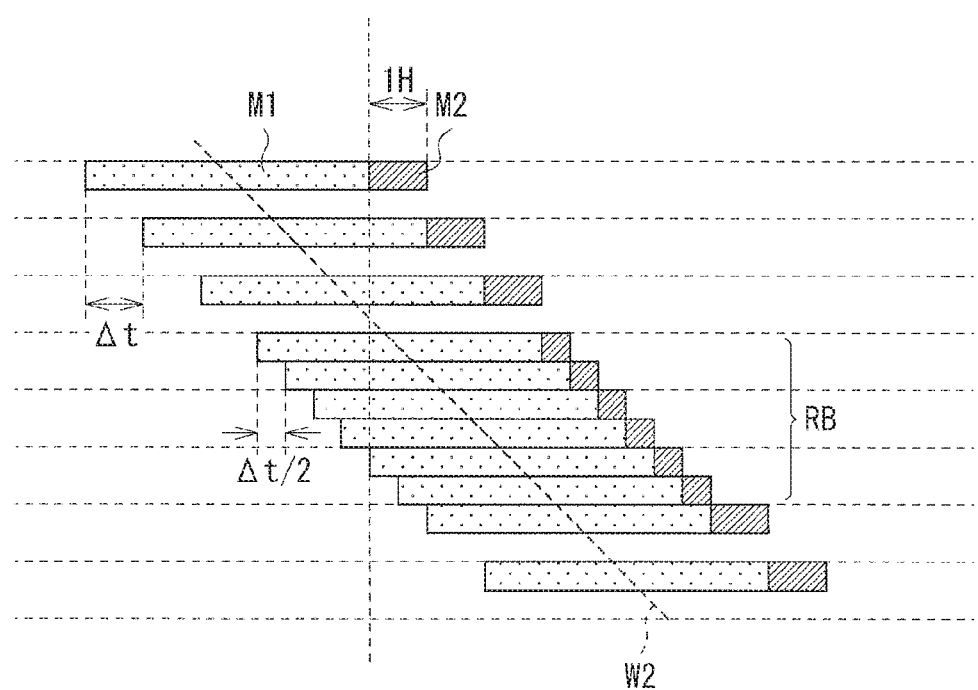

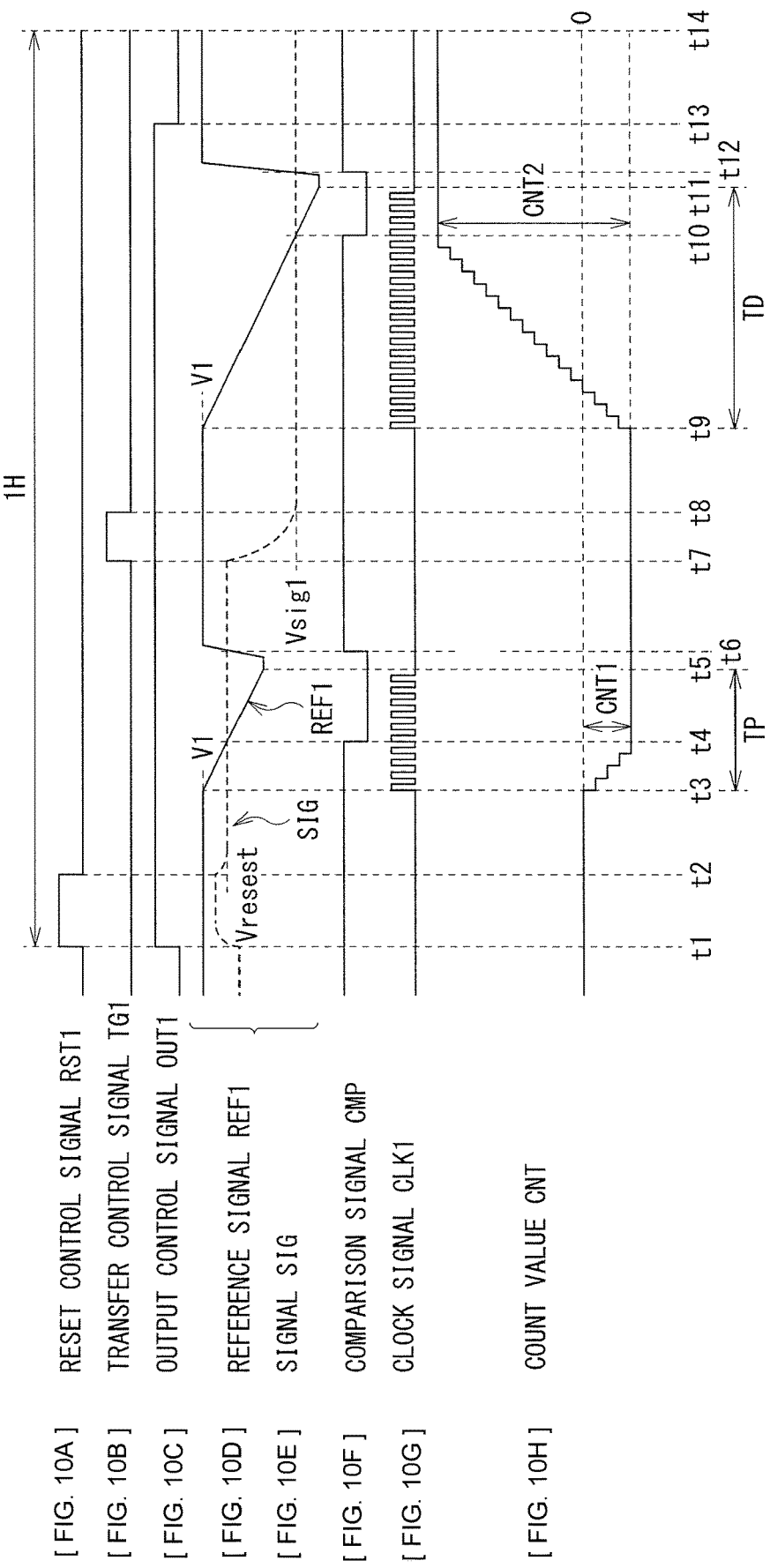

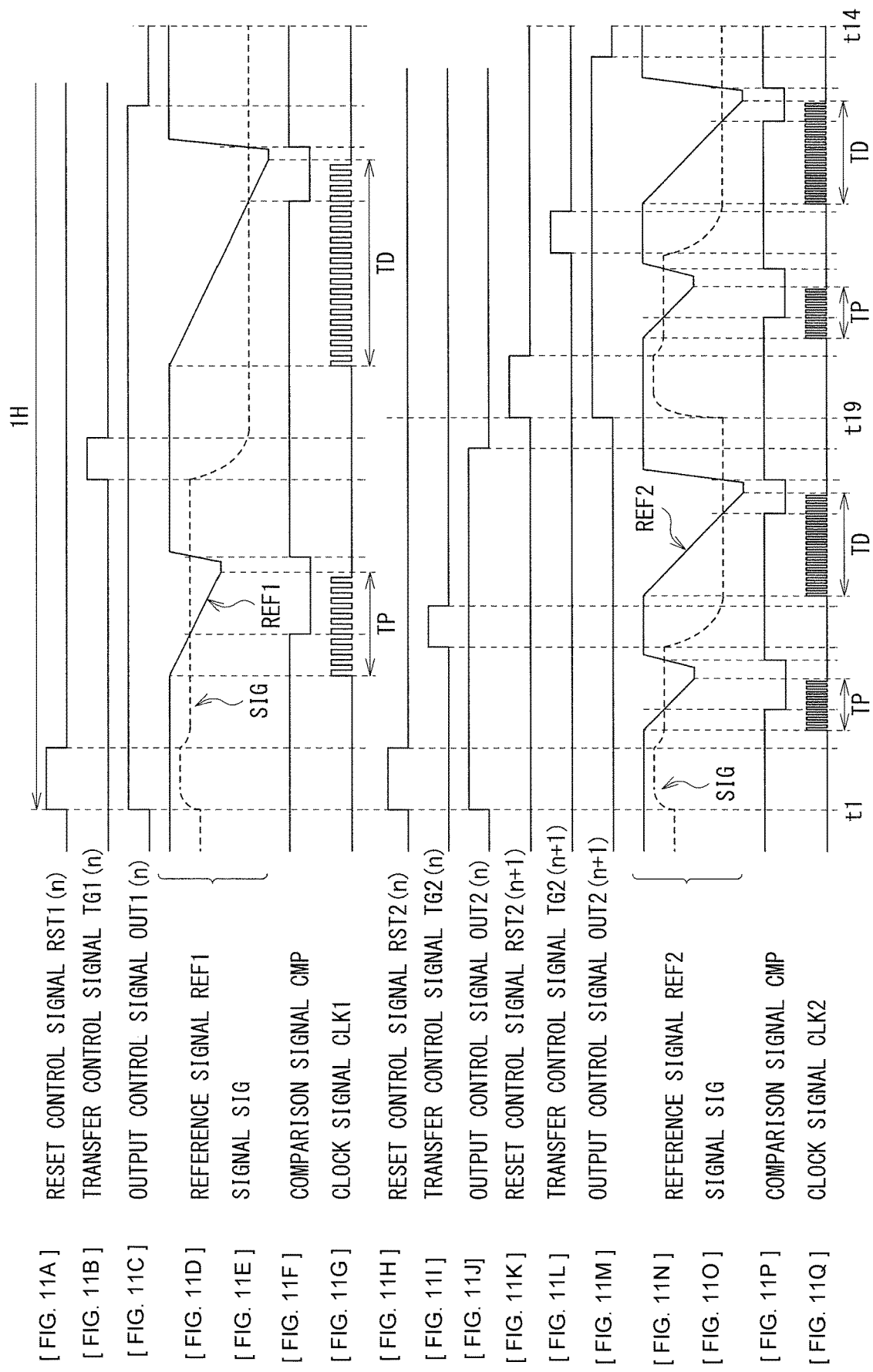

[FIG. 12]
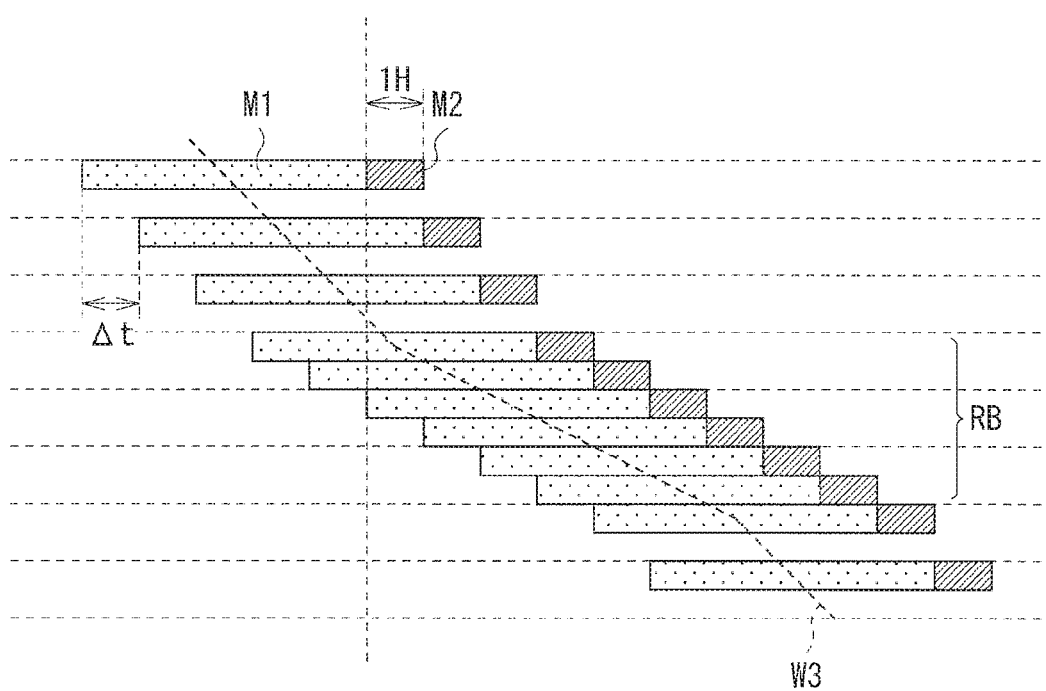

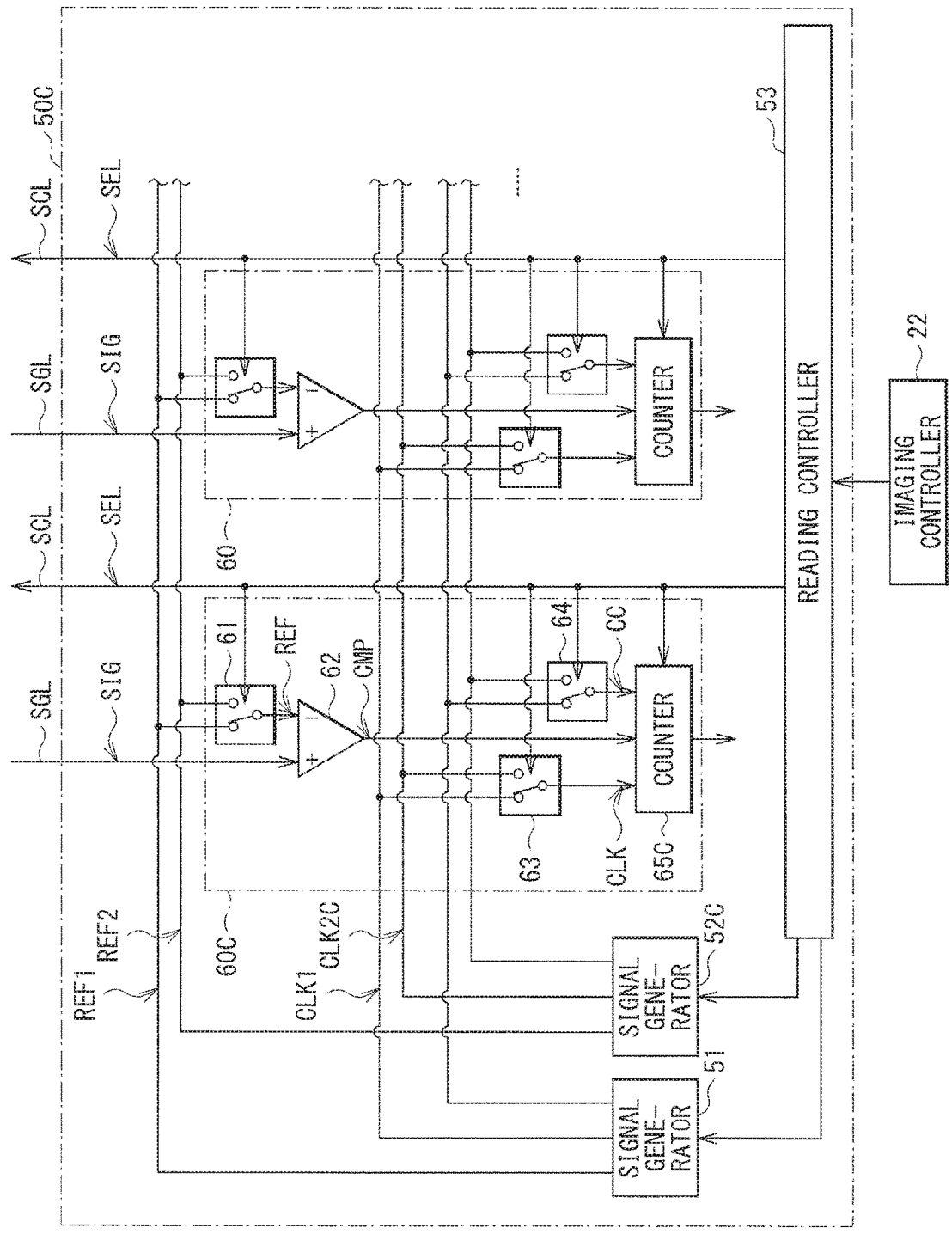
[FIG. 13]

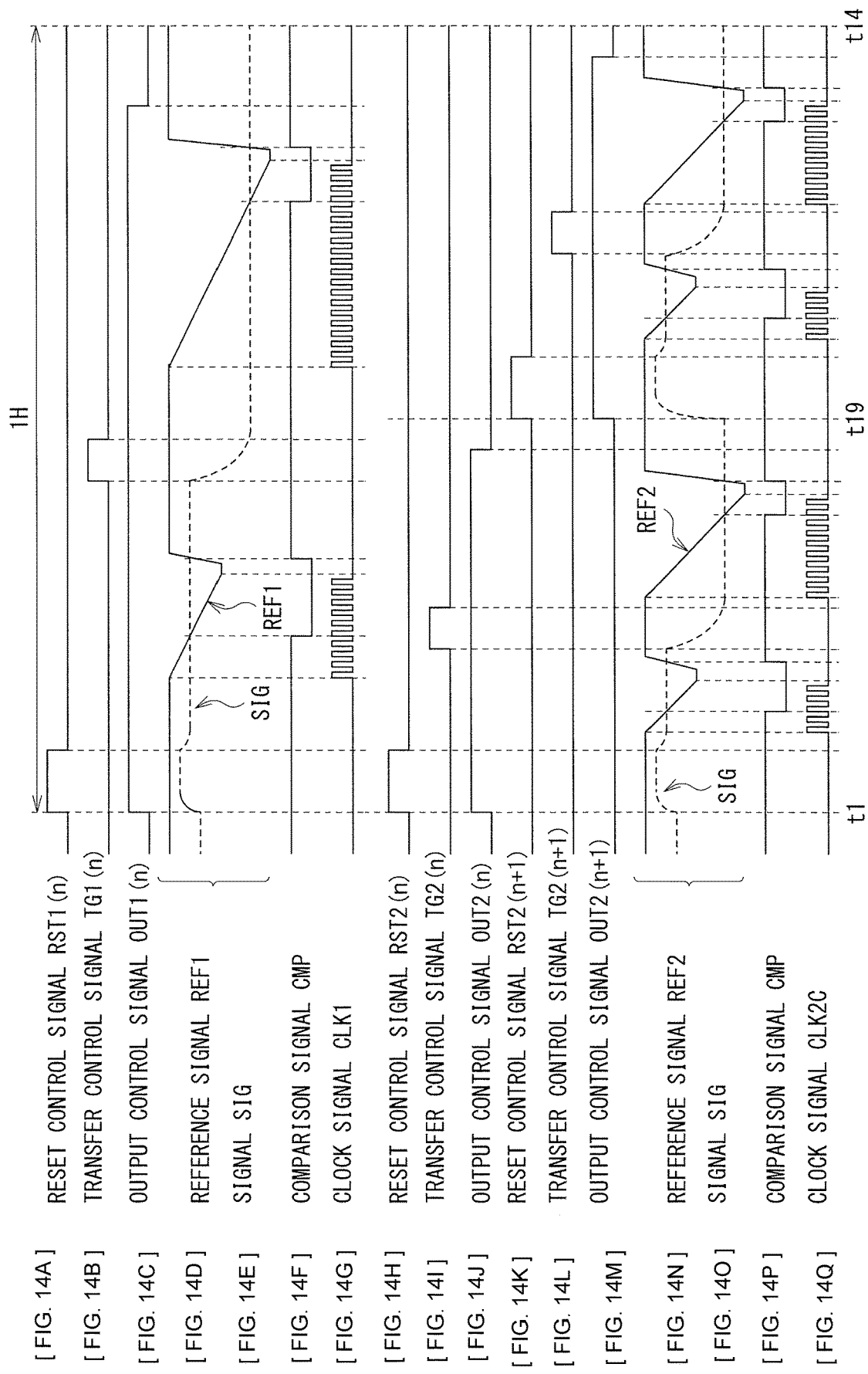

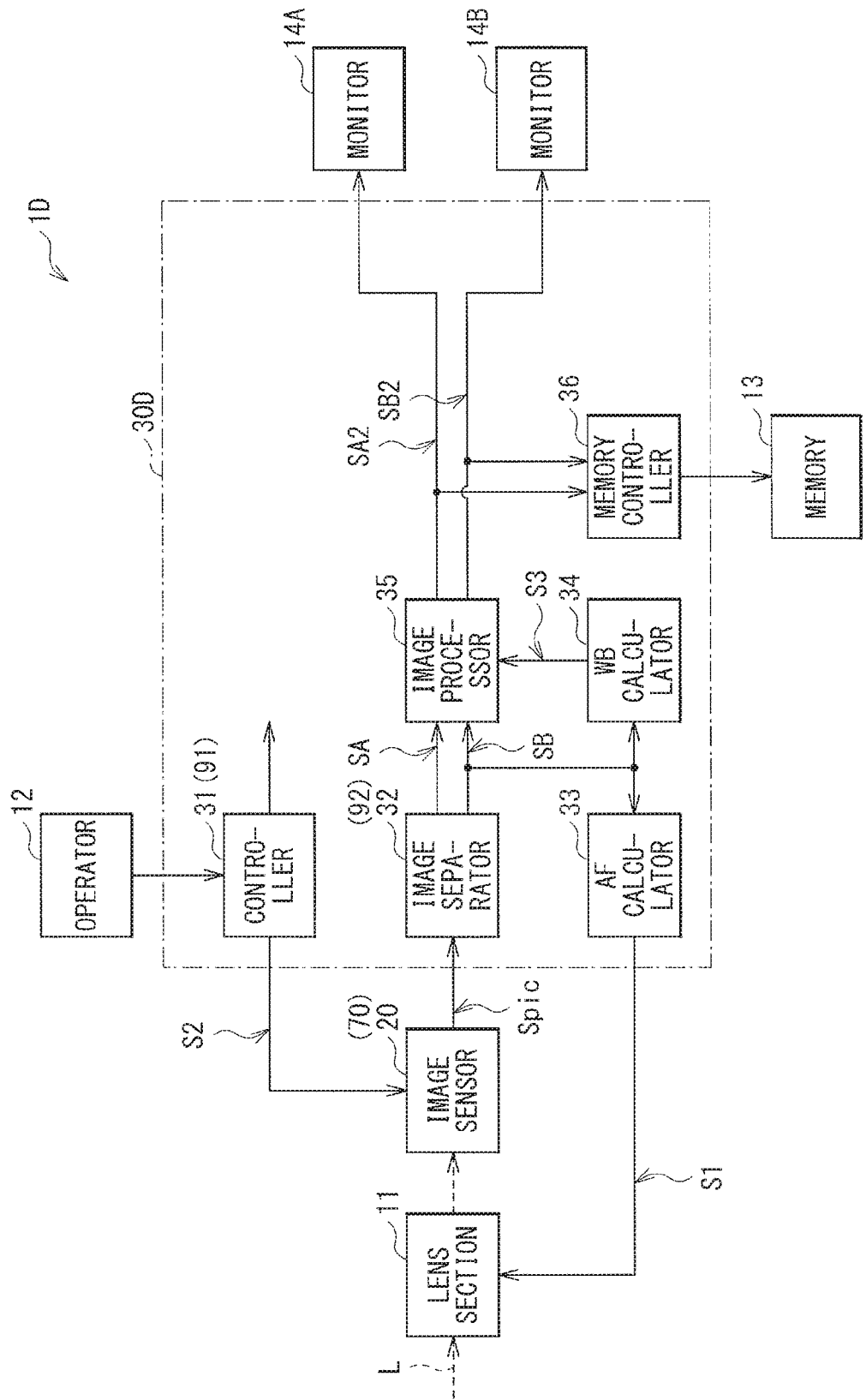
[FIG. 15]

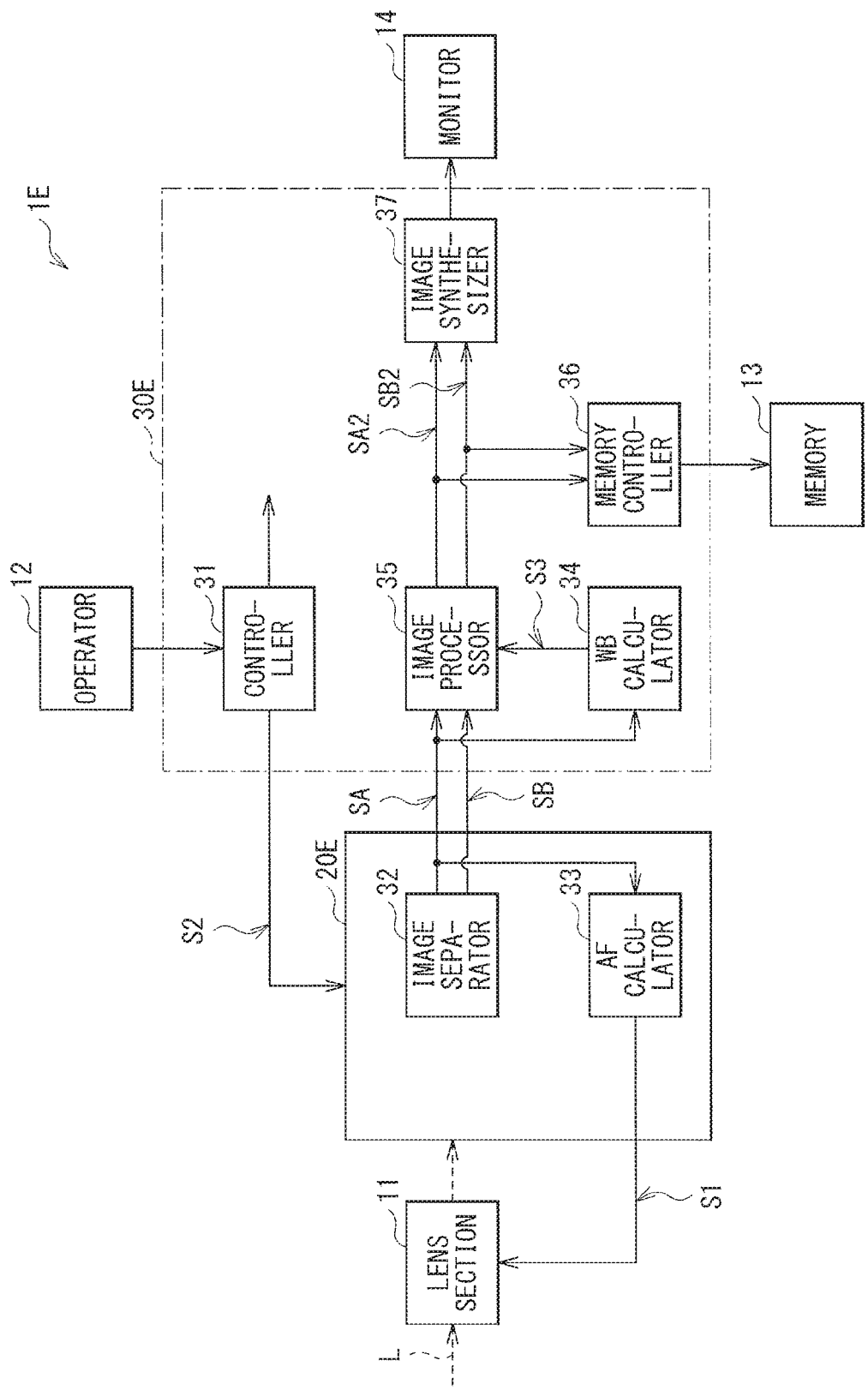
[FIG. 16]

[ FIG. 17 ]
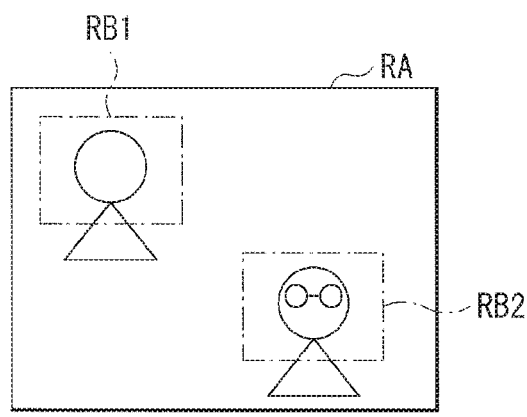
[ FIG. 18A ]
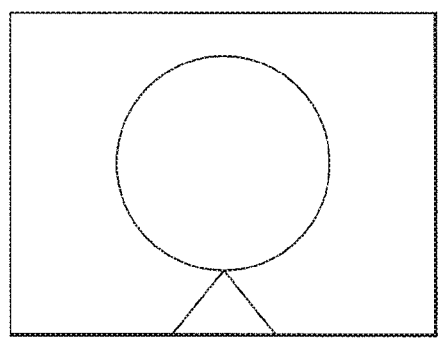
[ FIG. 18B ]
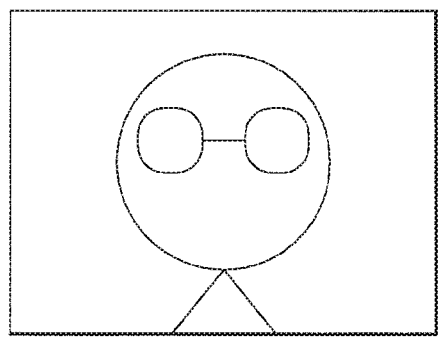

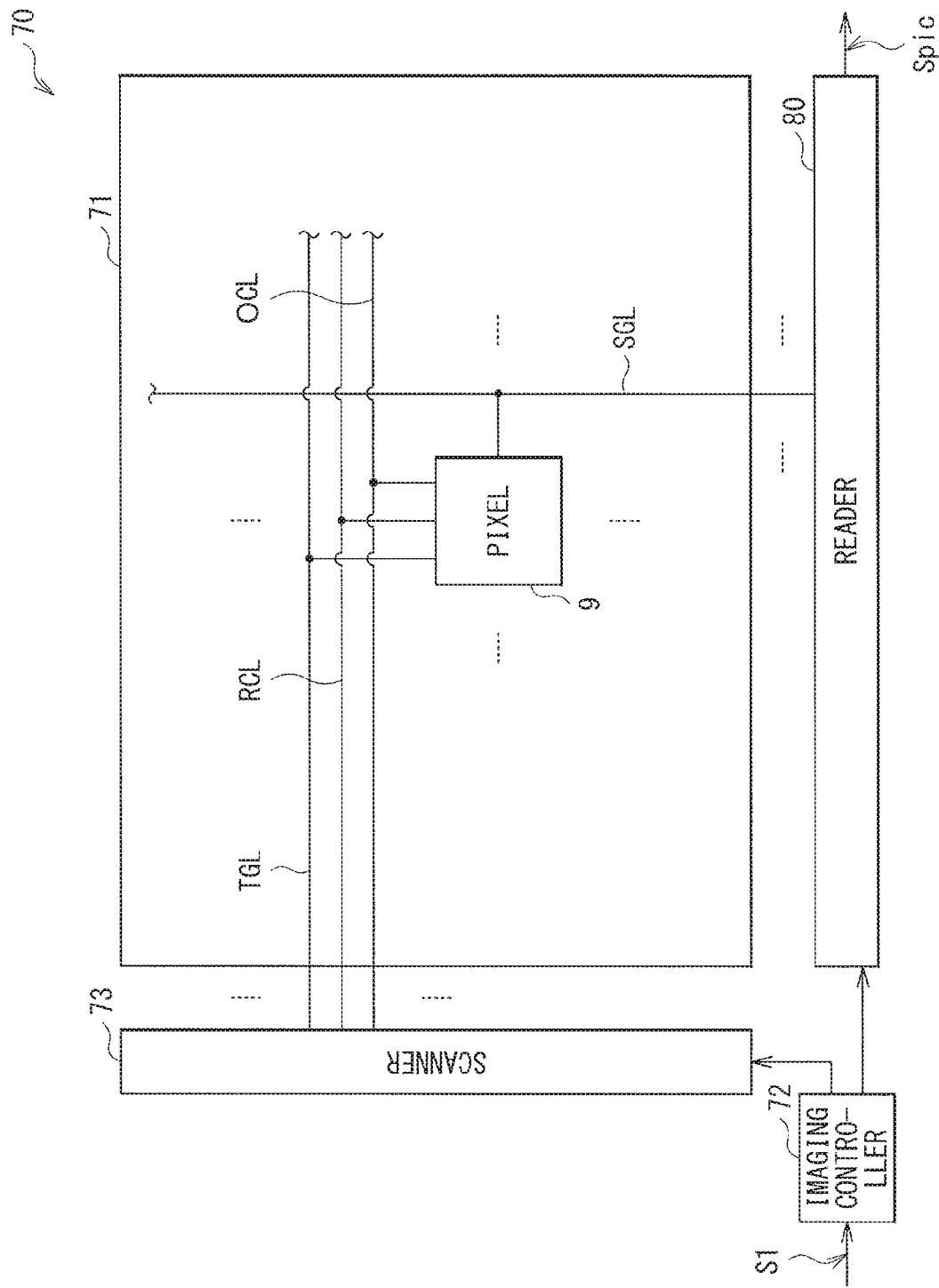
[FIG. 19]

[FIG. 20]
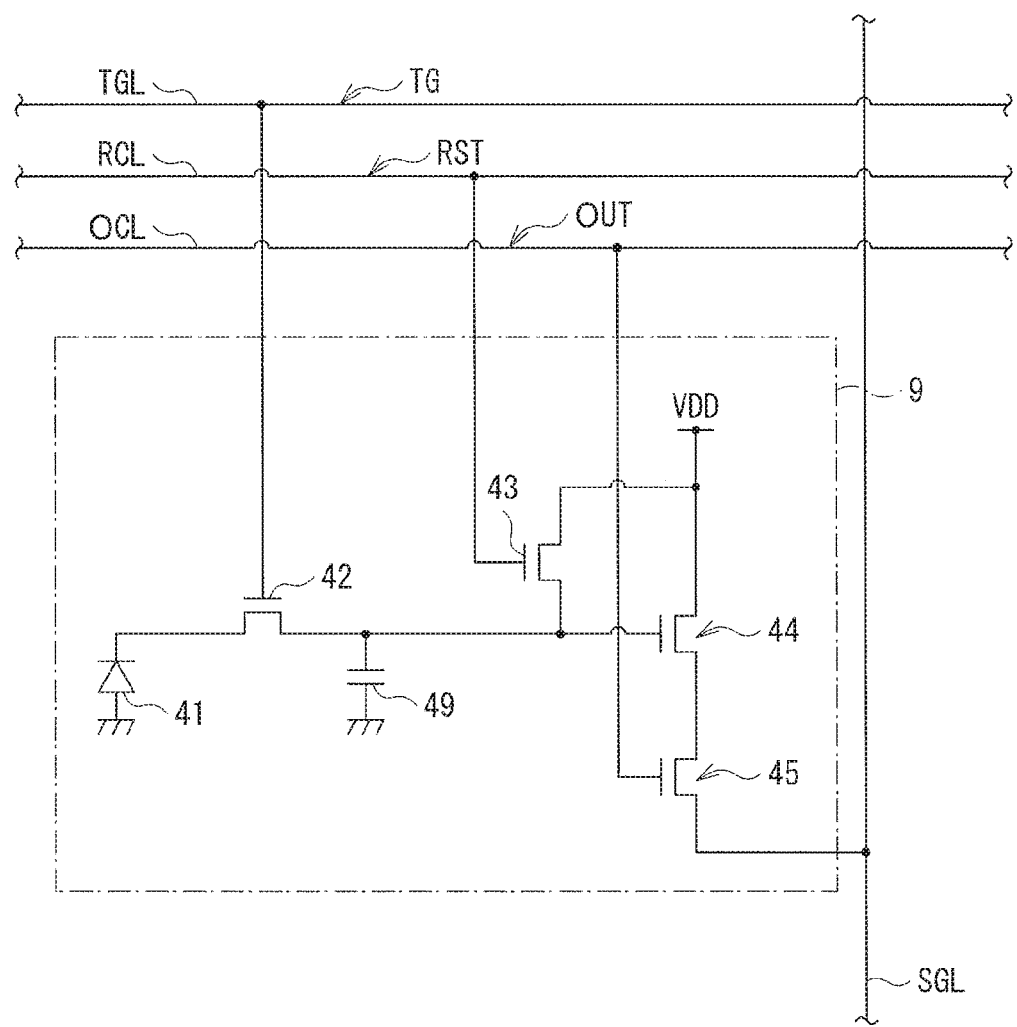

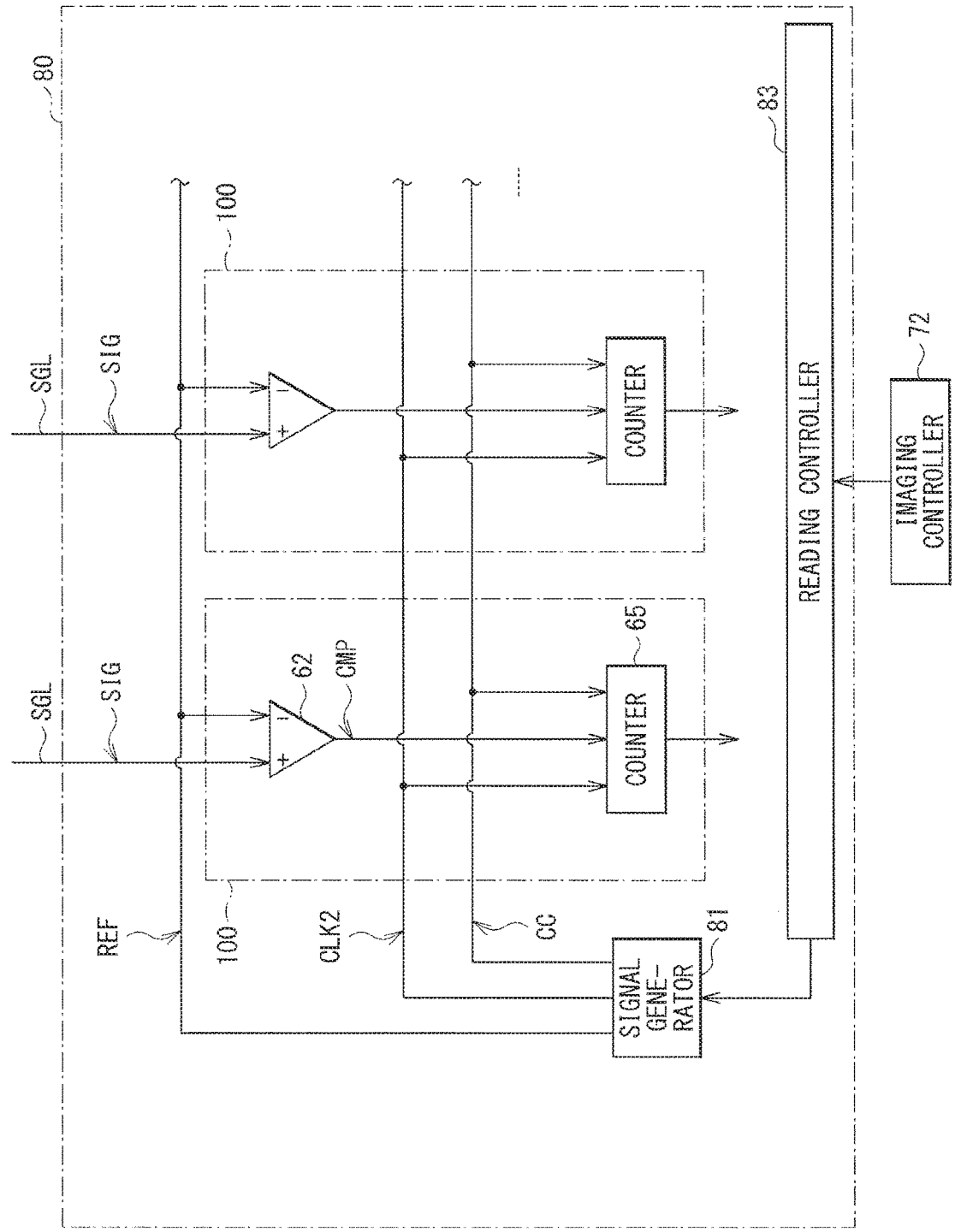
[FIG. 21]

[FIG. 22]
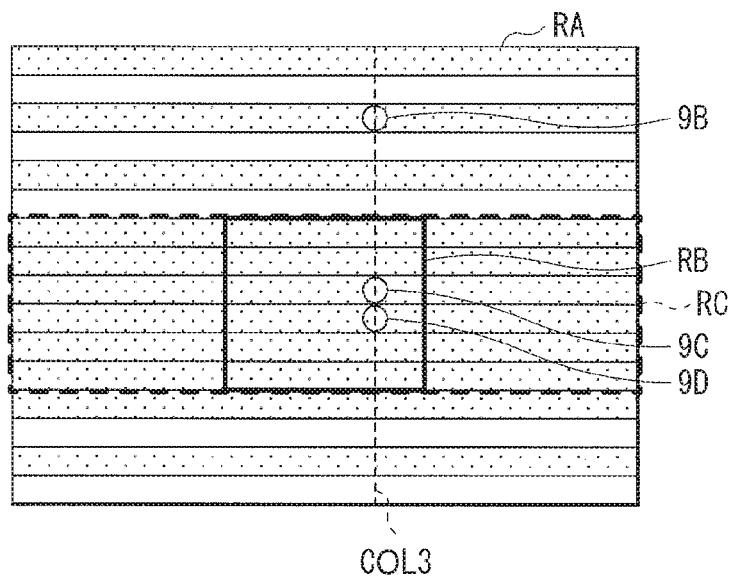
[FIG. 23]
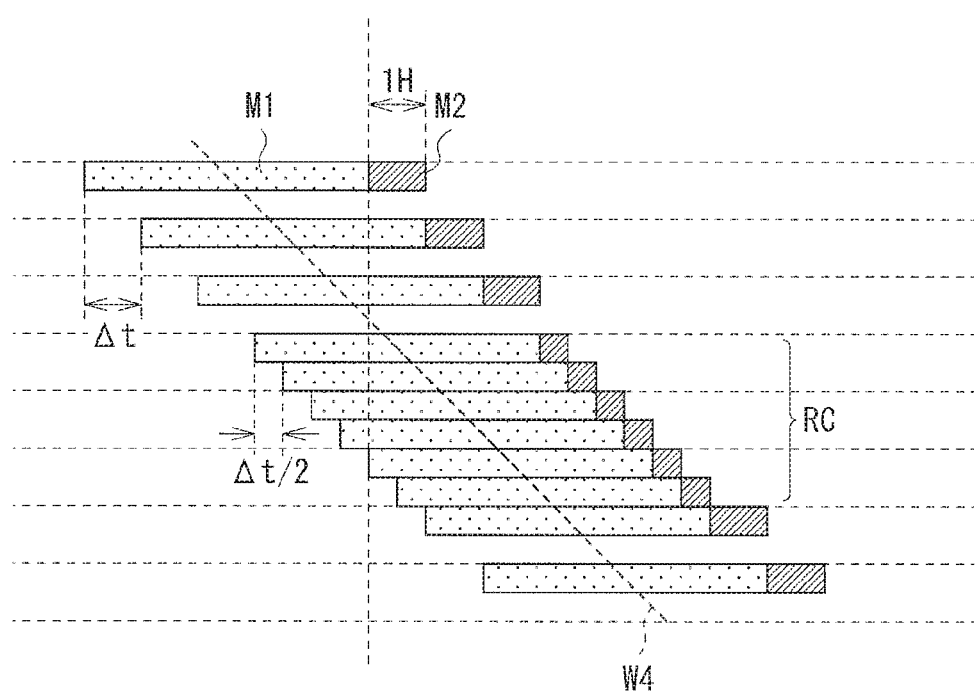

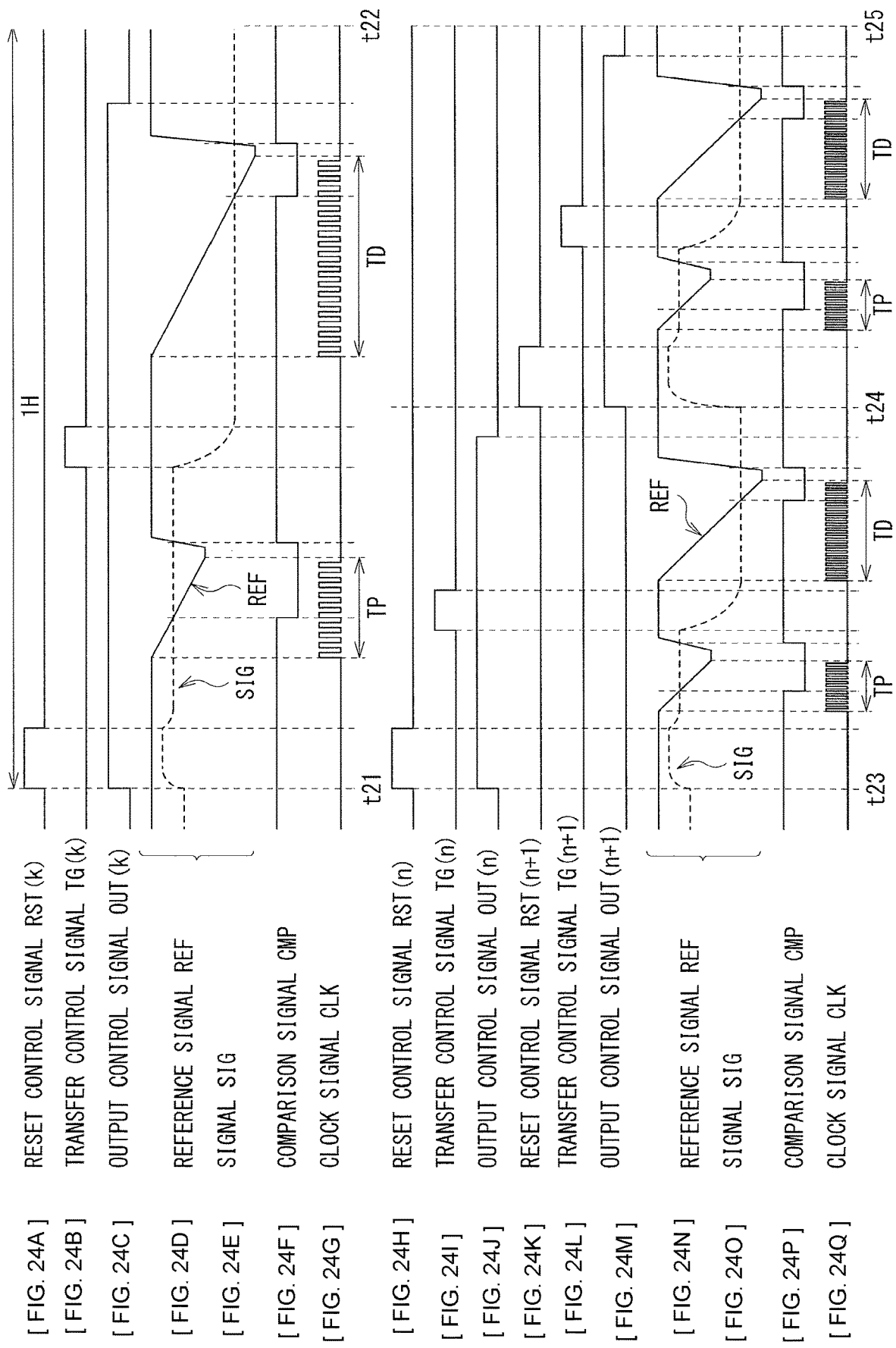

[FIG. 25]
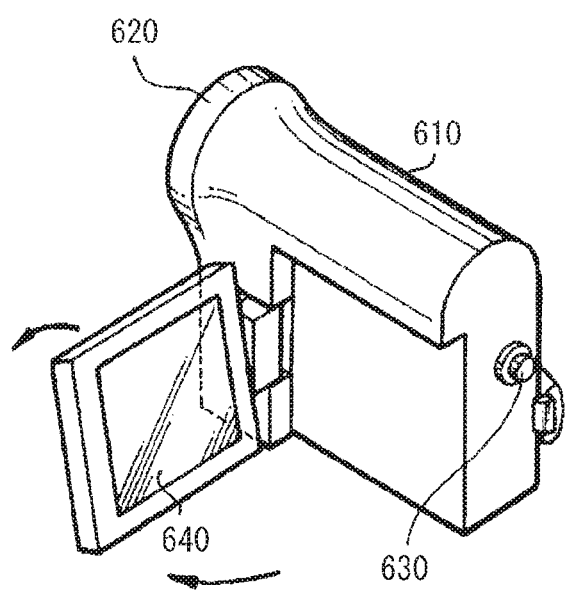

IMAGING CONTROL UNIT, IMAGING APPARATUS, AND IMAGING CONTROL METHOD

CROSS REFERENCE TO RELATED APPLICATIONS

This application is a U.S. National Phase of International Patent Application No. PCT/JP2017/000611 filed on Jan. 11, 2017, which claims priority benefit of Japanese Patent Application No. JP 2016-0039867 filed in the Japan Patent Office on Mar. 2, 2016. Each of the above-referenced applications is hereby incorporated herein by reference in its entirety.

TECHNICAL FIELD

The present disclosure relates to an imaging control unit that controls imaging operation, an imaging apparatus including such an imaging control unit, and an imaging control method used in such an imaging control unit.

BACKGROUND ART

In recent years, an imaging apparatus is mounted on various pieces of electronic equipment. For example, some imaging apparatuses acquire imaging data of all of the pixels for a portion of an imaging region, and acquire thinned imaging data for other regions (e.g., PTL 1).

CITATION LIST

Patent Literature

PTL 1: Japanese Unexamined Patent Application Publication No. 2000-32318

SUMMARY OF INVENTION

Incidentally, in the imaging apparatus, high image quality of a captured image is desired, and further improvement of image quality is expected.

It is desirable to provide an imaging control unit, an imaging apparatus, and an imaging control method that make it possible to enhance image quality of a captured image.

An imaging control unit according to an embodiment of the disclosure includes a first converter, a second converter, and a controller. The first converter performs AD conversion operation in a first conversion period on the basis of a pixel signal supplied from a first pixel included in a first region of an imaging section. The second converter performs the AD conversion operation in a second conversion period on the basis of a pixel signal supplied from a second pixel included in a second region that is different from the first region, of the imaging section. The controller controls a time length of the first conversion period to become shorter than a time length of the second conversion period.

An imaging apparatus according to an embodiment of the disclosure includes an imaging section, a first converter, a second converter, and a controller. The imaging section includes a plurality of pixels. The first converter performs AD conversion operation in a first conversion period on the basis of a pixel signal supplied from a first pixel included in a first region of the imaging section. The second converter performs the AD conversion operation in a second conversion period on the basis of a pixel signal supplied from a second pixel included in a second region that is different from the first region, of the imaging section. The controller controls a time length of the first conversion period to become shorter than a time length of the second conversion period.

An imaging control method according to an embodiment of the disclosure includes performing AD conversion operation in a first conversion period on the basis of a pixel signal supplied from a first pixel included in a first region of an imaging section, performing the AD conversion operation in a second conversion period on the basis of a pixel signal supplied from a second pixel included in a second region that is different from the first region, of the imaging section, and controlling a time length of the first conversion period to become shorter than a time length of the second conversion period.

In the imaging control unit, the imaging apparatus, and the imaging control method according to the respective embodiments of the disclosure, the AD conversion operation is performed in the first conversion period on the basis of the pixel signal supplied from the first pixel included in the first region, and the AD conversion operation is performed in the second conversion period on the basis of the pixel signal supplied from the second pixel included in the second region. The time length of the first conversion period is controlled so as to become shorter than the time length of the second conversion period.

According to the imaging control unit, the imaging apparatus, and the imaging control method of the respective embodiments of the disclosure, the time length of the first conversion period is controlled so as to become shorter than the time length of the second conversion period. This makes it possible to enhance image quality of a captured image. Note that the effects described here are not necessarily limited, and any effects described in the disclosure may be achieved.

BRIEF DESCRIPTION OF DRAWINGS

FIG. 1 is a block diagram illustrating a configuration example of an imaging apparatus according to an embodiment of the disclosure.

FIG. 2 is a block diagram illustrating a configuration example of an image sensor according to a first embodiment.

FIG. 3 is a circuit diagram illustrating a configuration example of a pixel illustrated in FIG. 2.

FIG. 4 is a block diagram illustrating a configuration example of a reader illustrated in FIG. 2.

FIG. 5 is an explanatory diagram illustrating an operation example of the image sensor illustrated in FIG. 2.

FIGS. 6A and 6B are explanatory diagrams illustrating an operation example of an image separator illustrated in FIG. 1.

FIG. 7 is an explanatory diagram illustrating an example of a display image displayed by a monitor illustrated in FIG. 1.

FIG. 8 is a timing chart illustrating an operation example of the image sensor illustrated in FIG. 2.

FIG. 9 is another timing chart illustrating an operation example of the image sensor illustrated in FIG. 2.

FIGS. 10A, 10B, 10C, 10D, 10E, 10F, 10G, and 10H are timing waveform diagrams illustrating an operation example of the image sensor illustrated in FIG. 2.

FIGS. 11A, 11B, 11C, 11D, 11E, 11F, 11G, 11H, 11I, 11J, 11K, 11L, 11M, 11N, 11O, 11P, and 11Q are another timing waveform diagrams illustrating an operation example of the image sensor illustrated in FIG. 2.

FIG. 12 is a timing chart illustrating an operation example of an image sensor according to a comparative example.

FIG. 13 is a block diagram illustrating a configuration example of a reader according to a modification example of the first embodiment.

FIGS. 14A, 14B, 14C, 14D, 14E, 14F, 14G, 14H, 14I, 14J, 14K, 14L, 14M, 14N, 14O, 14P, and 14Q are timing waveform diagrams illustrating an operation example of an image sensor according to the modification example of the first embodiment.

FIG. 15 is a block diagram illustrating a configuration example of an imaging apparatus according to another modification example of the first embodiment.

FIG. 16 is a block diagram illustrating a configuration example of an imaging apparatus according to still another modification example of the first embodiment.

FIG. 17 is an explanatory diagram illustrating an operation example of an imaging apparatus according to still another modification example of the first embodiment.

FIG. 18A is an explanatory diagram illustrating an operation example of the imaging apparatus according to still another modification example of the first embodiment.

FIG. 18B is an explanatory diagram illustrating an operation example of the imaging apparatus according to still another modification example of the first embodiment.

FIG. 19 is a block diagram illustrating a configuration example of an image sensor according to a second embodiment.

FIG. 20 is a circuit diagram illustrating a configuration example of a pixel illustrated in FIG. 19.

FIG. 21 is a block diagram illustrating a configuration example of a reader illustrated in FIG. 19.

FIG. 22 is an explanatory diagram illustrating an operation example of the image sensor illustrated in FIG. 19.

FIG. 23 is a timing chart illustrating an operation example of the image sensor illustrated in FIG. 19.

FIGS. 24A, 24B, 24C, 24D, 24E, 24F, 24G, 24H, 24I, 24J, 24K, 24L, 24M, 24N, 24O, 24P, and 24Q are timing waveform diagrams illustrating an operation example of the image sensor illustrated in FIG. 19.

FIG. 25 is a perspective view illustrating an appearance configuration of a video camera to which any of the embodiments is applied.

MODES FOR CARRYING OUT THE INVENTION

Some embodiments of the disclosure are described in detail below with reference to drawings. Note that description is given in the following order.
1. First embodiment
2. Second embodiment
3. Application examples

1. First Embodiment

CONFIGURATION EXAMPLE

Overall Configuration Example

FIG. 1 illustrates a configuration example of an imaging apparatus (imaging apparatus 1) according to a first embodiment. The imaging apparatus 1 is an imaging apparatus using an electronic shutter system that can image a moving image. Note that an imaging control unit and an imaging control method according to respective embodiments of the disclosure are embodied by the present embodiment, and are therefore described together.

The imaging apparatus 1 includes a lens section 11, an image sensor 20, an operator 12, a memory 13, a monitor 14, and a processor 30.

The lens section 11 includes, for example, one or a plurality of lenses and an actuator. The actuator moves the lenses along an optical axis on the basis of a control signal S1 when the imaging apparatus 1 performs automatic focus operation. In the imaging apparatus 1, light L enters the image sensor 20 through the lens section 11.

The image sensor 20 performs imaging operation, and includes, for example, a chip of a CMOS (Complementary Metal Oxide Semiconductor) image sensor. The image sensor 20 performs the imaging operation on the basis of an imaging control signal S2 supplied from the processor 30, and supplies, to the processor 30, an acquired captured image as an image signal Spic.

FIG. 2 illustrates a configuration example of the image sensor 20. The image sensor 20 includes a pixel array 21, an imaging controller 22, a scanner 23, and a reader 50.

The pixel array 21 includes a plurality of pixels 8 that are arranged in a matrix. Each of the pixels 8 outputs a signal of a level corresponding to a received light quantity. In addition, the pixel array 21 includes a plurality of transfer control lines TGL1 extending in a horizontal direction (lateral direction in FIG. 2), a plurality of transfer control lines TGL2 extending in the horizontal direction, a plurality of reset control lines RCL1 extending in the horizontal direction, a plurality of reset control lines RCL2 extending in the horizontal direction, a plurality of output control lines OCL1 extending in the horizontal direction, a plurality of output control lines OCL2 extending in the horizontal direction, a plurality of selection control lines SCL extending in a perpendicular direction (vertical direction in FIG. 2), and a plurality of signal lines SGL extending in the perpendicular direction. One end of each of the plurality of transfer control lines TGL1 and TGL2, one end of each of the plurality of reset control lines RCL1 and RCL2, and one end of each of the plurality of output control lines OCL1 and OCL2 are coupled to the scanner 23. One end of each of the plurality of selection control lines SCL and one end of each of the plurality of signal lines SGL are coupled to the reader 50.

FIG. 3 illustrates a configuration example of each of the pixels 8. Each of the pixels 8 includes a photodiode 41, transistors 42 to 45, a floating diffusion 49, and switches 46 to 48.

The photodiode 41 is a photoelectrically conversion device that generates electric charges of an amount corresponding to the received light quantity and accumulates the electric charges therein. For example, the photodiode 41 receives light transmitted through an unillustrated color filter. An anode of the photodiode 41 is grounded, and a cathode thereof is coupled to a source of the transistor 42.

The transistor 42 is an N-type MOS (Metal Oxide Semiconductor) transistor in this example. A gate of the transistor 42 is coupled to the switch 46, the source is coupled to the cathode of the photodiode 41, and a drain thereof is coupled to the floating diffusion 49, a source of the transistor 43, and a gate of the transistor 44.

The switch 46 couples one of the corresponding transfer control lines TGL1 and TGL2 and the gate of the transistor 42 on the basis of a selection control signal SEL supplied from the corresponding selection control line SCL. A transfer control signal TG1 is supplied to the transfer control lines TGL1 from the scanner 23, and a transfer control signal TG2 is supplied to the transfer control lines TGL2 from the scanner 23. Further, the selection control signal SEL is supplied to the selection control lines SCL from the reader 50.

The floating diffusion 49 accumulates electric charges. In the figure, the floating diffusion 49 is illustrated as a capacitor. The floating diffusion 49 is coupled to the drain of the transistor 42, the source of the transistor 43, and the gate of the transistor 44.

With this configuration, in each of the pixels 8, one of the transfer control signals TG1 and TG2 is selected on the basis of the selection control signal SEL, and the selected transfer control signal is supplied to the gate of the transistor 42. As a result, in each of the pixels 8, the transistor 42 is turned on, and the electric charges generated in the photodiode 41 are transferred to the floating diffusion 49 (transfer operation).

The transistor 43 is an N-type MOS transistor in this example, a gate thereof is coupled to the switch 47, a drain thereof is supplied with a power voltage VDD, and the source is coupled to the floating diffusion 49, the drain of the transistor 42, and the gate of the transistor 44.

The switch 47 couples one of the corresponding reset control lines RCL1 and RCL2 and the gate of the transistor 43 on the basis of the selection control signal SEL supplied from the corresponding selection control line SCL. A reset control signal RST1 is supplied to the reset control lines RCL1 by the scanner 23, and a reset control signal RST2 is supplied to the reset control lines RCL2 by the scanner 23.

With this configuration, in each of the pixels 8, one of the reset control signals RST1 and RST2 is selected on the basis of the selection control signal SEL, and the selected reset control signal is supplied to the gate of the transistor 43. As a result, in each of the pixels 8, the transistor 43 is turned on, the floating diffusion 49 is supplied with the power voltage VDD, and a voltage of the floating diffusion 49 is reset (reset operation) before the electric charges are transferred from the photodiode 41 to the floating diffusion 49.

Each of the transistors 44 and 45 is an N-type MOS transistor in this example. The gate of the transistor 44 is coupled to the floating diffusion 49, the drain of the transistor 42, and the source of the transistor 43, a drain thereof is supplied with the power voltage VDD, and a source thereof is coupled to a drain of the transistor 45. A gate of the transistor 45 is coupled to the switch 48, the drain is coupled to the source of the transistor 44, and a source thereof is coupled to the corresponding signal line SGL.

The switch 48 couples one of the corresponding output control lines OCL1 and OCL2 and the gate of the transistor 45 on the basis of the selection control signal SEL supplied from the corresponding selection control line SCL. An output control signal OUT1 is supplied to the output control lines OCL1 by the scanner 23, and an output control signal OUT2 is supplied to the output control lines OCL2 by the scanner 23.

With this configuration, in each of the pixels 8, one of the output control signals OUT1 and OUT2 is selected on the basis of the selection control signal SEL, and the selected output control signal is supplied to the gate of the transistor 45. As a result, in each of the pixels 8, the transistor 45 is turned on, and the transistor 44 outputs, as a signal SIG, a voltage corresponding to the voltage of the floating diffusion 49 to the corresponding signal line SGL through the transistor 45. Specifically, as described later, the transistor 44 outputs, as the signal SIG, a voltage Vreset corresponding to the voltage of the floating diffusion 49 at a time in a P-phase (Pre-charge phase) period TP after the voltage of the floating diffusion 49 is reset. Further, the transistor 44 outputs, as the signal SIG, a voltage Vsig corresponding to the voltage of the floating diffusion 49 at a time in a D-phase (Data phase) period TD after the electric charges are transferred from the photodiode 41 to the floating diffusion 49.

As described above, in the image sensor 20, the plurality of pixels 8 are scanned by the transfer control signals TG1 and TG2, the reset control signals RST1 and RST2, and the output control signals OUT1 and OUT2, and each of the pixels 8 outputs the signal SIG. At this time, in the image sensor 20, it is possible to select, on the basis of the selection control signal SEL, whether to use the transfer control signal TG1, the reset control signal RST1, and the output control signal OUT1, or to use the transfer control signal TG2, the reset control signal RST2, and the output control signal OUT2, on a column basis.

The imaging controller 22 (FIG. 2) supplies a control signal to each of the scanner 23 and the reader 50 on the basis of the imaging control signal S2, thereby controlling operation of the image sensor 20.

The scanner 23 scans the plurality of pixels 8 of the pixel array 21 on the basis of the control signal supplied from the imaging controller 22, and includes, for example, a shift register and an address decoder. Specifically, the scanner 23 supplies the reset control signals RST1 and RST2 to the respective reset control lines RCL1 and RCL2 of the pixel array 21, supplies the transfer control signals TG1 and TG2 to the respective transfer control lines TGL1 and TGL2, and supplies the output control signals OUT1 and OUT2 to the respective output control lines OCL1 and OCL2, thereby selecting the pixels 8 of the pixel array 21 on a row basis (on a pixel line basis).

The reader 50 supplies the selection control signal SEL to the selection control lines SCL of the pixel array 21 on the basis of the control signal supplied from the imaging controller 22, and generates the image signal Spic including captured image data on the basis of the signal SIG supplied through the signal lines SGL.

FIG. 4 illustrates a configuration example of the reader 50. In the figure, the imaging controller 22 is also illustrated in addition to the reader 50. The reader 50 includes signal generators 51 and 52, a plurality of AD (Analog-Digital) converters 60, and a reading controller 53.

The signal generator 51 generates a reference signal REF1, a clock signal CLK1, and a control signal CC1 on the basis of a control signal supplied from the reading controller 53. In this example, the reference signal REF1 has a so-called ramp waveform in which a voltage level is gradually decreased with time in the P-phase period TP and the D-phase period TD. The clock signal CLK1 is a clock signal used when the AD converters 60 perform AD conversion. The control signal CC1 is a signal to control the AD conversion by the AD converters 60.

The signal generator 52 generates a reference signal REF2, a clock signal CLK2, and a control signal CC2 on the basis of a control signal supplied from the reading controller 53. The reference signal REF2 corresponds to the reference signal REF1, and has a ramp waveform that includes a gradient larger than a gradient of the ramp waveform of the reference signal REF1. The clock signal CLK2 corresponds to the clock signal CLK1, and has a frequency higher than a frequency of the clock signal CLK1. The control signal CC2 corresponds to the control signal CC1.

Each of the AD converters 60 performs the AD conversion on the basis of the signal SIG (voltage Vreset and voltage Vsig) supplied from the pixel array 21. The plurality of AD converters 60 are each provided to corresponding one of the plurality of signal lines SGL included in the pixel array 21. Each of the AD converters 60 includes a switch 61, a comparator 62, switches 63 and 64, and a counter 65.

The switch 61 selects one of the reference signals REF1 and REF2 on the basis of the selection control signal SEL, and supplies the selected signal as a reference signal REF to the comparator 62.

The comparator 62 compares the signal SIG supplied to a positive input terminal and the reference signal REF supplied to a negative input terminal, and outputs a comparison result as a comparison signal CMP.

Similarly to the switch 61, the switch 63 selects one of the clock signals CLK1 and CLK2 on the basis of the selection control signal SEL, and supplies the selected signal as a clock signal CLK to the counter 65.

Similarly to the switch 61, the switch 64 selects one of the control signals CC1 and CC2 on the basis of the selection control signal SEL, and supplies the selected signal as a control signal CC to the counter 65.

The counter 65 performs count-up operation or count-down operation on the basis of the comparison signal CMP, the clock signal CLK, and the control signal CC. Specifically, as described later, the counter 65 starts the count-down operation on the basis of the control signal CC, and stops the count-down operation on the basis of the comparison signal CMP, in the P-phase period TP. Further, the counter 65 starts the count-up operation on the basis of the control signal CC, and stops the count-up operation on the basis of the comparison signal CMP, in the D-phase period TD. Further, the counter 65 outputs a final count value after the D-phase period TD.

The reading controller 53 supplies the control signal to each of the signal generators 51 and 52 in response to an instruction from the imaging controller 22, thereby controlling operation of the signal generators 51 and 52. Further, the reading controller 53 generates a plurality of selection control signals SEL, and supplies the plurality of generated selection control signals SEL to the plurality of AD converters 60 and to the plurality of selection control lines SCL of the pixel array 21.

With this configuration, in the reader 50, each of the AD converters 60 performs the AD conversion on the basis of the reference signals REF1 and REF2, the clock signals CLK1 and CLK2, the control signals CC1 and CC2, and the signal SIG. Specifically, first, the reading controller 53 generates the selection control signals SEL to select whether each of the AD converters 60 uses the reference signal REF1, the clock signal CLK1, and the control signal CC1, or uses the reference signal REF2, the clock signal CLK2, and the control signal CC2, on a column basis. Thereafter, as described later, each of the AD converters 60 performs the AD conversion on the voltage Vsig and the voltage Vreset with use of the selected reference signal, clock signal, and control signal, and determines a pixel value PV of the corresponding one of the pixels 8 on the basis of a difference of results of the AD conversion. Further, the reader 50 generates the image signal Spic including the captured image data on the basis of the pixel values PV.

The operator 12 (FIG. 1) includes, for example, a touch screen and various kinds of buttons, and receives operation by a user. Further, the operator 12 generates a control signal on the basis of the operation by the user, and supplies the control signal to the processor 30. The memory 13 includes, for example, a nonvolatile semiconductor memory, and holds imaging data supplied from the processor 30. The monitor 14 includes, for example, a liquid crystal display, and displays an image on a basis of image data supplied from the processor 30.

The processor 30 performs signal processing on the basis of the image signal Spic, and includes, for example, an integrated circuit. The processor 30 includes a controller 31, an image separator 32, an AF (Auto Focus) calculator 33, a WB (White Balance) calculator 34, an image processor 35, a memory controller 36, and an image synthesizer 37.

The controller 31 controls operation of the imaging apparatus 1. Specifically, the controller 31 controls operation of each of the blocks in the processor 30 on the basis of the control signal supplied from the operator 12. Further, the controller 31 generates the imaging control signal S2 and supplies the imaging control signal S2 to the image sensor 20, thereby controlling operation of the image sensor 20. The imaging apparatus 1 includes two operation modes MODE1 and MODE2. The operation mode MODE1 is a mode in which imaging data for all of the pixels are acquired in an imaging-possible region RA in which the image sensor 20 is able to image. The operation mode MODE2 is a mode in which imaging data for all pixels are acquired in a portion of the imaging-possible region RA and thinned imaging data are acquired in a region other than the portion of the imaging-possible region RA, for example, in a case where the imaging apparatus 1 performs electronic zoom or manual focusing.

FIG. 5 schematically illustrates an imaging operation state in the operation mode MODE2. In FIG. 5, a shaded part indicates a part where the imaging operation is performed, and an unshaded part indicates a part where the imaging operation is not performed. In this example, in the image sensor 20, all of the pixels 8 in a partial region RB perform the imaging operation. Further, in the image sensor 20, thinning scanning is performed on the region other than the region RB at a rate of one line per two lines. As a result, the pixels 8 included in odd lines perform the imaging operation in this example.

The controller 31 performs operation in the operation mode MODE2, for example, in the case where the imaging apparatus 1 performs electronic zoom or manual focusing. Specifically, for example, in a case of performing electronic zoom, the controller 31 sets, as the region RB, a region where the electronic zoom is desired to be performed. Further, for example, in a case of performing manual focusing, the controller 31 sets, as the region RB, a region that is enlarged and displayed to allow the user to easily perform focusing. Moreover, the controller 31 supplies the imaging control signal S2 to the image sensor 20, which makes it possible to control the image sensor 20 to perform the imaging operation illustrated in FIG. 5.

The image separator 32 generates an entire image PA and a detailed image PB on the basis of the image signal Spic in the case where the image sensor 20 performs the imaging operation illustrated in FIG. 5.

FIGS. 6A and 6B schematically illustrate an operation example of the image separator 32, where FIG. 6A illustrates the entire image PA, and FIG. 6B illustrates the detailed image PB. The image separator 32 generates the entire image PA on the basis of the data, included in the image signal Spic, relating to the pixels 8 included in the odd lines of the imaging-possible region RA, and generates the detailed image PB on the basis of the data, included in the image signal Spic, relating to all of the pixels 8 in the region RB. Further, the image separator 32 supplies the entire image PA to the image processor 35 with use of an image signal SA, and supplies the detailed image PB to the image processor 35, the AF calculator 33, and the WB calculator 34 with use of an image signal SB.

The AF calculator 33 performs predetermined calculation on the basis of the image signal SB, and controls the lens section 11 with use of the control signal 51 to adjust a focal point in the imaging apparatus 1. Specifically, to obtain the focused detailed image PB, the AF calculator 33 adjusts the focal point in the imaging apparatus 1.

The WB calculator 34 performs predetermined calculation on the basis of the image signal SB to generate a signal S3 used for adjustment of white balance. Specifically, the WB calculator 34 determines setting that provides desired white balance of the detailed image PB, and outputs the setting as the signal S3.

The image processor 35 performs predetermined image processing on the basis of the image signal SA to generate an image signal SA2, and performs predetermined image processing on the basis of the image signal SB to generate an image signal SB2. The predetermined image processing includes, for example, white balance adjustment processing performed on the basis of the signal S3.

The memory controller 36 stores the image in the memory 13 on the basis of the image signals SA2 and SB2.

The image synthesizer 37 performs image synthesizing processing on the basis of the image signals SA2 and SB2, to generate a display image PP to be displayed on the monitor 14.

FIG. 7 schematically illustrates an example of the display image PP. An image PB2 corresponding to the detailed image PB is displayed on the entire display screen of the monitor 14 in this example, and an image PA2 corresponding to the entire image PA is displayed as picture-in-picture at a lower right part thereon in this example.

The image synthesizer 37 reduces the image PA2 in size while reducing resolution such that the image PA2 corresponding to the imaging-possible region RA of the image sensor 20 is displayed in a narrow region in the monitor 14, as compared with the image PB2 corresponding to the region RB in the imaging-possible region RA. Further, as illustrated in FIG. 7, the image synthesizer 37 positions the image PA2 at a lower right part of the image PB2 to generate the display image PP in this example.

For example, in the case of performing electronic zoom, an image of the region where the electronic zoom is desired to be performed (region RB) is displayed as the image PB2 on the entire display screen, and an image in the imaging-possible region RA is displayed as picture-in-picture, as the image PA2. The image PA2 includes a frame FB indicating the region RB that is electronically zoomed. In other words, an image inside the frame FB of the image PA2 corresponds to the image PB2. This allows the user to grasp which region is targeted for the electronic zoom in the imaging-possible region RA. Further, in the case of performing manual focusing, an image of the region that is enlarged and displayed to allow the user to easily perform focusing (region RB) is displayed as the image PB2 on the entire display screen, and an image of the imaging-possible region RA is displayed as picture-in-picture, as the image PA2. This allows the user to grasp which region is targeted for enlargement and display in the imaging-possible region RA.

Here, each of the AD converters 60 corresponds to a specific example of "converter" in the disclosure. The comparator 62 corresponds to a specific example of "comparator" in the disclosure. The controller 31, the imaging controller 22, the reading controller 53, and the signal generators 51 and 52 correspond to specific examples of "controller" in the disclosure. The image synthesizer 37 corresponds to a specific example of "image generator" in the disclosure. The pixel array 21 corresponds to a specific example of "imaging section" in the disclosure. A first region corresponds to a specific example of "region RB" in the disclosure. The D-phase period TD corresponds to a specific example of "conversion period" in the disclosure. The voltage Vsig of the signal SIG corresponds to a specific example of "pixel signal" in the disclosure.

[Operation and Action]

Subsequently, operation and action of the imaging apparatus 1 according to the present embodiment are described.

(Overall Operation Outline)

First, overall operation outline of the imaging apparatus 1 is described with reference to FIG. 1. The image sensor 20 performs the imaging operation with use of the lens section 11 on the basis of the imaging control signal S2, and supplies the acquired captured image as the image signal Spic to the processor 30. The image separator 32 generates the entire image PA and the detailed image PB on the basis of the image signal Spic. The image separator 32 supplies the entire image PA to the image processor 35 with use of the image signal SA, and supplies the detailed image PB to the image processor 35, the AF calculator 33, and the WB calculator 34 with use of the image signal SB. The AF calculator 33 performs the predetermined calculation on the basis of the image signal SB, and controls the lens section 11 with use of the control signal 51, thereby adjusting the focal point in the imaging apparatus 1. The WB calculator 34 performs the predetermined calculation on the basis of the image signal SB, to generate the signal S3 used for adjustment of white balance. The image processor 35 performs the predetermined image processing on the basis of the image signal SA, to generate the image signal SA2, and performs the predetermined image processing on the basis of the image signal SB, to generate the image signal SB2. The memory controller 36 causes the image to be stored in the memory 13 on the basis of the image signals SA2 and SB2. The memory 13 holds the imaging data supplied from the memory controller 36. The image synthesizer 37 performs the image synthesizing processing on the basis of the image signals SA2 and SB2, to generate the display image PP. The monitor 14 displays the display image PP.

(Detailed Operation)

In the operation mode MODE1, the controller 31 controls the operation of the image sensor 20 so as to acquire the imaging data of all of the pixels in the imaging-possible region RA in which the image sensor 20 is able to image. Further, for example, in the case of performing electronic zoom or manual focusing in response to user operation, the controller 31 shifts the operation mode from the operation mode MODE1 to the operation mode MODE2. Moreover, in the operation mode MODE2, the controller 31 controls the operation of the image sensor 20 so as to acquire the imaging data of all of the pixels in the partial region RB of the imaging-possible region RA, and to acquire the thinned imaging data in a region other than the partial region RB thereof, as illustrated in FIG. 5.

A case where the image sensor 20 performs the operation illustrated in FIG. 5 in the operation mode MODE2 is described in detail below.

FIG. 8 illustrates an example of scanning to the plurality of pixels 8 included in a column COL1 illustrated in FIG. 5. FIG. 9 illustrates an example of scanning to the plurality of pixels 8 included in a column COL2 illustrated in FIG. 5. In the image sensor 20, first, the pixels 8 perform accumulation operation M1, and the reader 50 then performs reading operation M2 on the pixels 8. In the accumulation operation M1, the photodiodes 41 generate the electronic charges having an amount corresponding to the received light quantity and accumulate the electronic charges therein. Further, in the reading operation M2, the pixels 8 sequentially output the voltage Vreset and the voltage Vsig, and the reader 50 determines the pixel values PV on the basis of the voltage Vreset and the voltage Vsig.

As illustrated in FIG. 8, in the scanning to the pixels 8 included in the column COL1, the pixels 8 included in odd lines sequentially start the accumulation operation M1 with an interval of a time Δt in order from top. In addition, after the pixels 8 perform the accumulation operation M1 for a predetermined time, the reader 50 performs the reading operation M2 sequentially on the pixels 8.

In contrast, as illustrated in FIG. 9, in the scanning to the pixels 8 included in the column COL2, all of the pixels 8 in the region RB sequentially start the accumulation operation M1 in order from top. At this time, the pixels 8 in the region RB sequentially start the accumulation operation M1 with a time interval of half (Δt/2) of the time Δt. Further, after these pixels 8 perform the accumulation operation M1 for a predetermined time, the reader 50 performs the reading operation M2 sequentially on these pixels 8. At this time, in the imaging apparatus 1, a length of a period in which the reading operation M2 is performed on the pixels 8 in the region RB is set to a half of a length of a period in which the reading operation M2 is performed on the pixels 8 outside the region RB. As a result, in the imaging apparatus 1, it is possible to enhance uniformity of focal plane distortion, and to enhance image quality of the captured image, as described later in comparison with a comparative example.

FIGS. 10A, 10B, 10C, 10D, 10E, 10F, 10G, and 10H illustrate an example of the reading operation M2 to a pixel 8A outside the region RB, where FIG. 10A illustrates a waveform of the reset control signal RST1, FIG. 10B illustrates a waveform of the transfer control signal TG1, FIG. 10C illustrates a waveform of the output control signal OUT1, FIG. 10D illustrates a waveform of the reference signal REF1, FIG. 10E illustrates a waveform of the signal SIG, FIG. 10F illustrates a waveform of the comparison signal CMP, FIG. 10G illustrates a waveform of the clock signal CLK1, and FIG. 10H illustrates the count value CNT of the counter 65. Here, in (D) and (E) of FIGS. 10D and 10E, the waveforms of the respective signals are illustrated on the same voltage axis. Since the pixel 8A is the pixel 8 outside the region RB, the reading controller 53 uses the selection control signal SEL to perform control such that the transfer control signal TG1, the reset control signal RST1, and the output control signal OUT1 are selected in the pixel 8A, and the reference signal REF1, the clock signal CLK1, and the control signal CC1 are selected in the corresponding AD converter 60.

In the image sensor 20, the scanner 23 first causes the pixel 8A to perform reset operation in one horizontal period (1H), and the AD converter 60 performs AD conversion on the basis of the voltage Vreset outputted from the pixel 8A in the subsequent P-phase period TP. Thereafter, the scanner 23 causes the pixel 8A to perform transfer operation, and the AD converter 60 performs the AD conversion on the basis of the voltage Vsig outputted from the pixel 8A in the D-phase period TD. The operation is described in detail below.

First, at timing t1, the scanner 23 changes the voltage of the reset control signal RST1 from a low level to a high level (FIG. 10A). Therefore, the transistor 43 is turned on in the pixel 8A, and as a result, the voltage of the floating diffusion 49 is set to the power voltage VDD, and the voltage of the floating diffusion 49 is reset. Further, at the same time, the scanner 23 changes the voltage of the output control signal OUT1 from a low level to a high level (FIG. 10C). As a result, the transistor 45 is turned on in the pixel 8A, and the pixel 8A is electrically coupled to the signal line SGL.

Next, at timing t2, the scanner 23 changes the voltage of the reset control signal RST1 from the high level to the low level (FIG. 10A). As a result, the transistor 43 is turned off in the pixel 8A. Further, the pixel 8A outputs, as the signal SIG, the voltage Vreset corresponding to the voltage of the floating diffusion 49 at this time, after timing t2.

Next, in a period (P-phase period TP) from timing t3 to timing t5, the reader 50 performs the AD conversion on the basis of the voltage Vreset. Specifically, first, at timing t3, the signal generator 51 starts to generate the clock signal CLK1 (FIG. 10G), and starts to decrease the voltage of the reference signal REF1 from the voltage V1 at a predetermined variation degree (FIG. 10D), on the basis of the control signal supplied from the reading controller 53. Accordingly, the counter 65 of the AD converter 60 thereafter performs the count-down operation to sequentially decrease the count value CNT (FIG. 10H).

Further, at timing t4, the voltage of the reference signal REF1 becomes lower than the voltage Vreset of the signal SIG (FIGS. 10D and 10E). Accordingly, the comparator 62 of the AD converter 60 changes the voltage of the comparison signal CMP from a high level to a low level (FIG. 10F). As a result, the counter 65 stops the count-down operation (FIG. 10H). The AD converter 60 converts the voltage Vreset into a digital value (count value CNT1) in the above-described manner.

Next, at timing t5, the signal generator 51 stops generation of the clock signal CLK1 (FIG. 10G) and stops variation of the voltage of the reference signal REF1 on the basis of the control signal supplied from the reading controller 53, and then returns the voltage of the reference signal REF1 to the voltage V1 (FIG. 10D). At this time, at timing t6, the voltage of the reference signal REF1 becomes larger than the voltage Vreset of the signal SIG (FIGS. 10D and 10E). Accordingly, the comparator 62 of the AD converter 60 changes the voltage of the comparison signal CMP from the low level to the high level (FIG. 10F).

Further, at timing t7, the scanner 24 changes the voltage of the transfer control signal TG1 from a low level to a high level (FIG. 10B). Therefore, the transistor 42 is turned on in the pixel 8A, and as a result, the electric charges generated in the photodiode 41 are transferred to the floating diffusion 49. Accordingly, the voltage of the signal SIG is gradually decreased (FIG. 10E).

Thereafter, at timing t8, the scanner 23 changes the voltage of the transfer control signal TG1 from the high level to the low level (FIG. 10B). As a result, the transistor 42 is turned off in the pixel 8A. Further, the pixel 8A outputs, as the signal SIG, the voltage Vsig corresponding to the voltage of the floating diffusion 49 at this time, after timing t8.

Next, in a period (D-phase period TD) from timing t9 to timing t11, the reader 50 performs the AD conversion on the basis of the voltage Vsig. Specifically, first, at timing t9, the signal generator 51 starts to generate the clock signal CLK1 (FIG. 10G), and starts to decrease the voltage of the reference signal REF1 from the voltage V1 at a predetermined variation degree (FIG. 10D), on the basis of the control signal supplied from the reading controller 53. Accordingly, the counter 65 of the AD converter 60 thereafter performs the count-up operation to sequentially increase the count value CNT (FIG. 10H).

Further, at timing t10, the voltage of the reference signal REF1 becomes lower than the voltage Vsig of the signal SIG (FIGS. 10D and 10E). Accordingly, the comparator 62 of the AD converter 60 changes the voltage of the comparison signal CMP from the high level to the low level (FIG. 10F). As a result, the counter 65 stops the count-up operation (FIG. 10H). Accordingly, the AD converter 60 converts the voltage Vsig into a digital value (count value CNT2) in the above-described manner. Further, the AD converter 60 outputs the count value CNT (CNT2−CNT1).

Next, at timing t11, the signal generator 51 stops generation of the clock signal CLK1 (FIG. 10G) on the basis of the control signal supplied from the reading controller 53. At the same time, the signal generator 51 stops variation of the voltage of the reference signal REF1, and then returns the voltage of the reference signal REF1 to the voltage V1 (FIG. 10D). At this time, at timing t12, the voltage of the reference signal REF1 becomes larger than the voltage Vsig of the signal SIG (FIGS. 10D and 10E). Accordingly, the comparator 62 of the AD converter 60 changes the voltage of the comparison signal CMP from the low level to the high level (of FIG. 10F).

Next, at timing t13, the scanner 23 changes the voltage of the output control signal OUT1 from the high level to the low level (FIG. 10C). As a result, the transistor 45 is turned off in the pixel 8A, and the pixel 8A is electrically decoupled from the signal line SGL.

As described above, in the image sensor 20, the digital value (count value CNT1) is acquired through the AD conversion of the voltage Vreset and the digital value (count value CNT2) is acquired through the AD conversion of the voltage Vsig, and then a difference (CNT2−CNT1) of the digital values is determined. Since correlated double sampling is performed in the image sensor 20, it is possible to remove noise component included in the voltage Vsig. As a result, it is possible to enhance image quality of the captured image.

In addition, in the image sensor 20, the counter 65 that performs the count-down operation and the count-up operation is provided. Therefore, for example, it is unnecessary to provide a calculator that determines the difference between the two count values CNT1 and CNT2, which makes it possible to simplify the circuit configuration.

Next, the reading operation M2 with respect to two pixels 8C and 8D inside the region RB is described in comparison with the reading operation M2 with respect to a pixel 8B outside the region RB. As illustrated in FIG. 5, the pixel 8B is the pixel 8 included in n-th pixel line in the column COL1. The pixel 8C is the pixel 8 included in n-th pixel line in the column COL2, and the pixel 8D is the pixel 8 included in (n+1)-th pixel line in the column COL2.

FIGS. 11A, 11B, 11C, 11D, 11E, 11F, and 11G illustrate an example of operation to the pixel 8B, where FIG. 11A illustrates a waveform of the reset control signal RST1(*n*) corresponding to n-th pixel line, FIG. 11B illustrates a waveform of the transfer control signal TG1(*n*) corresponding to n-th pixel line, FIG. 11C illustrates a waveform of the output control signal OUT1(*n*) corresponding to n-th pixel line, FIG. 11D illustrates a waveform of the reference signal REF1, FIG. 11E illustrates a waveform of the signal SIG, FIG. 11F illustrates a waveform of the comparison signal CMP, and FIG. 11G illustrates a waveform of the clock signal CLK1. Since the pixel 8B is the pixel 8 outside the region RB, the reading controller 53 uses the selection control signal SEL to perform control such that the transfer control signal TG1, the reset control signal RST1, and the output control signal OUT1 are selected in the pixel 8B, and the reference signal REF1, the clock signal CLK1, and the control signal CC1 are selected in corresponding AD converter 60. Accordingly, as with the case illustrated in FIGS. 10A, 10B, 10C, 10D, 10E, 10F, and 10G, the reader 50 performs the reading operation M2 on the pixel 8B in a period from timing t1 to timing t14.

FIGS. 11H, 11I, 11J, 11K, 11L, 11M, 11N, 11O, 11P, and 11Q illustrate an example of operation to the two pixels 8C and 8D, where FIG. 11H illustrates a waveform of the reset control signal RST2(*n*) corresponding to n-th pixel line, FIG. 11I illustrates a waveform of the transfer control signal TG2(*n*) corresponding to n-th pixel line, FIG. 11J illustrates a waveform of the output control signal OUT2(*n*) corresponding to n-th pixel line, FIG. 11K illustrates a waveform of the reset control signal RST2(*n*+1) corresponding to (n+1)-th pixel line, FIG. 11L illustrates a waveform of the transfer control signal TG2(*n*+1) corresponding to (n+1)-th pixel line, FIG. 11M illustrates a waveform of the output control signal OUT2(*n*+1) corresponding to (n+1)-th pixel line, FIG. 11N illustrates a waveform of the reference signal REF2, FIG. 11O illustrates a waveform of the signal SIG, FIG. 11P illustrates a waveform of the comparison signal CMP, and FIG. 11Q illustrates a waveform of the clock signal CLK2. Since the pixels 8C and 8D are the pixels 8 inside the region RB, the reading controller 53 uses the selection control signal SEL to perform control such that the transfer control signal TG2, the reset control signal RST2, and the output control signal OUT2 are selected in each of the pixels 8C and 8D, and the reference signal REF2, the clock signal CLK2, and the control signal CC2 are selected in corresponding AD converter 60.

The pixel 8C performs the reset operation, the output of the voltage Vreset, the transfer operation, and the output of the voltage Vsig on the basis of the reset control signal RST2(*n*), the transfer control signal TG2(*n*), and the output control signal OUT2(*n*) (FIGS. 11H, 11I, 11J, and 11O) in a period from timing t1 to timing t19. Likewise, the pixel 8D performs the reset operation, the output of the voltage Vreset, the transfer operation, and the output of the voltage Vsig on the basis of the reset control signal RST2(*n*+1), the transfer control signal TG2(*n*+1), and the output control signal OUT2(*n*+1) (FIGS. 11K, 11L, 11M, and 11O) in a subsequent period from timing t19 to timing t14. The AD converter 60 performs the AD conversion with use of the reference signal REF2 (FIG. 11M) having a larger gradient of a ramp waveform than that of the reference signal REF1 (FIG. 11D), and the clock signal CLK2 (FIG. 11Q) having higher frequency than that of the clock signal CLK1 (FIG. 11G). In this example, the gradient of the ramp waveform of the reference signal REF2 is set to two times the gradient of the ramp waveform of the reference signal REF1, and the frequency of the clock signal CLK2 is set to two times the frequency of the clock signal CLK1. Therefore, in this example, it is possible to reduce the length of the P-phase period TP by half, and to reduce the length of the D-phase period TD by half. As a result, in the image sensor 20, it is possible to reduce the length of the period in which the reading operation M2 is performed on the pixels 8 inside the region RB to half of the length of the period in which the reading operation M2 is performed on the pixels 8 outside the region RB, as illustrated in FIG. 9.

As described above, in the imaging apparatus 1, the reading controller 53 generates the selection control signal SEL on the basis of whether the pixel 8 of interest is located inside the region RB. Further, each of the pixels 8 selects, on the basis of the selection control signal SEL, whether to use the transfer control signal TG1, the reset control signal RST1, and the output control signal OUT1, or to use the transfer control signal TG2, the reset control signal RST2, and the output control signal OUT2. Moreover, each of the AD converters 60 selects, on the basis of the selection control signal SEL, whether to use the reference signal REF1, the clock signal CLK1, and the control signal CC1, or to use the reference signal REF2, the clock signal CLK2, and the control signal CC2. As a result, in the imaging apparatus 1, it is possible to reduce the length of the period in which the reading operation M2 is performed on the pixels 8 inside the region RB to half of the length of the period in which the reading operation M2 is performed on the pixels 8 outside the region RB. This makes it possible to enhance uniformity of focal plane distortion and to enhance image quality of the captured image, as described below in comparison with a comparative example 2.

Next, action of the present embodiment is described in comparison with some comparative examples.

Comparative Example 1

In an imaging apparatus 1Q according to a comparative example 1, all of the pixels in the imaging-possible region perform the imaging operation, and the entire image PA and the detailed image PB are generated on the basis of the acquired captured image. In this case, although uniformity of focal plane distortion is enhanced, power consumption may become large because the reader performs the reading operation on all of the pixels. Further, in the imaging apparatus 1Q, the frame rate may not be increased because the reading operation is performed on all of the pixels.

In contrast, in the imaging apparatus 1 according to the present embodiment, the reading operation M2 is performed on all of the pixels 8 in the region RB, and the reading operation M2 is performed on the pixels 8 included in the odd lines in the region other than the region RB, as illustrated in FIG. 5. As described above, in the imaging apparatus 1, the reading operation M2 is performed only on the pixels 8 demanding the reading operation M2. This makes it possible to reduce the power consumption and to increase the frame rate.

Comparative Example 2

In an imaging apparatus 1R according to a comparative example 2, the length of the period in which the reading operation M2 is performed on the pixels 8 inside the region RB and the length of the period in which the reading operation M2 is performed on the pixels 8 outside the region RB are made equal to each other.

FIG. 12 illustrates an example of scanning to the pixels 8 included in the column COL2, in the imaging apparatus 1R. Also in this example, as with the case of the present embodiment (FIG. 9), all of the pixels 8 in the region RB sequentially start the accumulation operation M1 in order from top. At this time, the pixels 8 inside the region RB sequentially start the accumulation operation M1 with an interval of a time Δt. Further, after the pixels 8 perform the accumulation operation M1 for a predetermined time, a reader 50R of the imaging apparatus 1R performs the reading operation M2 sequentially on the pixels 8.

As described above, in the imaging apparatus 1R according to the comparative example, the length of the period in which the reading operation M2 is performed is made uniform in one frame. Specifically, the length of the period in which the reading operation M2 is performed on the pixels 8 inside the region RB and the length of the period in which the reading operation M2 is performed on the pixels 8 outside the region RB are made equal to each other. As a result, as illustrated by characteristics W3 in FIG. 12, the timings at which the accumulation operation M1 is performed are not arranged in one straight line, which may cause nonuniform focal plane distortion and deteriorate image quality of the captured image.

In contrast, in the imaging apparatus 1 according to the present embodiment, the length of the period in which the reading operation M2 is varied in one frame. Specifically, as illustrated in FIG. 9, the length of the period in which the reading operation M2 is performed on the pixels 8 inside the region RB is reduced to half of the length of the period in which the reading operation M2 is performed on the pixels 8 outside the region RB. As a result, in the imaging apparatus 1, as illustrated by characteristics W2 in FIG. 9, the timings at which the accumulation operation M1 is performed are arranged in one straight line. This makes it possible to enhance uniformity of focal plane distortion, and to enhance image quality of the captured image. As a result, for example, in a case of causing the captured image to be stored in the memory 13, it is possible to save the captured image with high image quality. Further, for example, in a case where the display image PP as illustrated in FIG. 7 is displayed, it is possible to reduce the difference of focal plane distortion between the inside and the outside of the frame FB in the image PA2.

[Effects]

As described above, in the present embodiment, the length of the period in which the reading operation is performed on the pixels inside the region RB is reduced to half of the length of the period in which the reading operation is performed on the pixels 8 outside the region RB. This makes it possible to enhance uniformity of focal plane distortion and to enhance image quality of the captured image.

In the present embodiment, the reading operation is performed only on the pixels demanding the reading operation. This makes it possible to reduce the power consumption and to reduce the frame rate.

Modification Example 1-1

In the above-described embodiment, in the operation mode MODE2, all of the pixels 8 perform the imaging operation in the region RB, and the pixels 8 perform the imaging operation at a rate of one line per two lines in the region other than the region RB; however, the configuration is not limited thereto. Alternatively, for example, the imaging operation may be performed at a rate of one line per four lines in the region other than the region RB. In this case, for example, it is possible to reduce the length of the period in which the reading operation M2 is performed on the pixels inside the region RB to one-fourth of the length of the period in which the reading operation M2 is performed on the pixels 8 outside the region RB. Further, for example, thinning scanning may be performed also on the region RB, and the lines may be further thinned in the region other than the region RB. Specifically, for example, the imaging operation may be performed at a rate of one line per two lines in the region RB, and the imaging operation may be performed at a rate of one line per four lines in the region other than the region RB.

Modification Example 1-2

In the above-described embodiment, in the operation mode MODE2, the length of the period in which the reading operation M2 is performed on the pixels 8 inside the region RB is reduced to half of the length of the period in which the reading operation M2 is performed on the pixels 8 outside the region RB; however, the configuration is not limited thereto. It is sufficient to make the length of the period in which the reading operation M2 is performed on the pixels 8 inside the region RB shorter than the length of the period in which the reading operation M2 is performed on the pixels 8 outside the region RB. As a result, it is possible to improve uniformity of focal plane distortion, which makes it possible to enhance image quality of the captured image.

Likewise, in the above-described embodiment, the length of the D-phase period TD for the pixels 8 inside the region RB is set to half of the length of the D-phase period TD for the pixels 8 outside the region RB, as illustrated in FIGS. 11A, 11B, 11C, 11D, 11E, 11F, 11G, 11H, 11I, 11J, 11K, 11L, 11M, 11N, 11O, 11P, and 11Q; however, the configuration is not limited thereto. In the above-described embodiment, the length of the P-phase period TP for the pixels 8 inside the region RB is set to half of the length of the P-phase period TP for the pixels 8 outside the region RB; however, the configuration is not limited thereto.

Modification Example 1-3

In the above-described embodiment, in the operation mode MODE2, the frequency of the clock signal CLK2 is set higher than the frequency of the clock signal CLK1; however, the frequency is not limited thereto. Alternatively, the frequencies of the two clock signals may be set equal to each other. An imaging apparatus 1C according to the present modification example is described in detail below.

FIG. 13 illustrates a configuration example of a reader 50C relating to the imaging apparatus 1C. The reader 50C includes a signal generator 52C and AD converters 60C.

The signal generator 52C generates the reference signal REF2, a clock signal CLK2C, and the control signal CC2 on the basis of the control signal supplied from the reading controller 53. The clock signal CLK2C corresponds to the clock signal CLK1, and includes the frequency same as the frequency of the clock signal CLK1.

Each of the AD converters 60C includes a counter 65C. The counter 65C performs count-up operation or count-down operation on the basis of the comparison signal CMP, the clock signal CLK, the control signal CC, and the selection control signal SEL. At this time, in a case where the switch 63 selects the clock signal CLK2C on the basis of the selection control signal SEL, the counter 65C doubles the final count value and outputs the doubled count value.

FIGS. 14A, 14B, 14C, 14D, 14E, 14F, 14G, 14H, 14I, 14J, 14K, 14L, 14M, 14N, 14O, 14P, and 14Q illustrate an example of the reading operation M2 with respect to the pixel 8B outside the region RB and the pixels 8C and 8D inside the region RB in the column COL2. FIGS. 14A, 14B, 14C, 14D, 14E, 14F, and 14G illustrate an example of the operation to the pixel 8B outside the region RB, and FIGS. 14H, 14I, 14J, 14K, 14L, 14M, 14N, 14O, 14P, and 14Q illustrate an example of the operation to the two pixels 8C and 8D inside the region RB.

The pixel 8C performs the reset operation, the output of the voltage Vreset, the transfer operation, and the output of the voltage Vsig on the basis of the reset control signal RST2($n$), the transfer control signal TG2($n$), and the output control signal OUT2($n$) (FIGS. 14H, 14I, 14J, and 14O) in a period from timing t1 to timing t19. Likewise, the pixel 8D performs the reset operation, the output of the voltage Vreset, the transfer operation, and the output of the voltage Vsig on the basis of the reset control signal RST2($n$+1), the transfer control signal TG2($n$+1), and the output control signal OUT2($n$+1) (FIGS. 14K, 14L, and 14O) in a subsequent period from timing t19 to timing t14. The AD converter 60C performs the AD conversion with use of the reference signal REF2 (FIG. 14N) having a larger gradient of a ramp waveform than that of the reference signal REF1 (FIG. 14D), and the clock signal CLK2C (FIG. 14Q) having a frequency that is equal to that of the clock signal CLK1 (FIG. 14G). At this time, since the frequency of the clock signal CLK2C is half of the frequency of the clock signal CLK2 (FIG. 11Q) according to the above-described embodiment, the final count value of the counter 65C becomes half of that in the case of the above-described embodiment. Accordingly, the counter 65C doubles the final count value and outputs the doubled count value.

Even with this configuration, it is possible to achieve effects similar to those in the case of the above-described embodiment.

Modification Example 1-4

In the above-described embodiment, the processor 30 includes the image synthesizer 37; however, the configuration is not limited thereto. Alternatively, the image synthesizer may be omitted as with, for example, an imaging apparatus 1D illustrated in FIG. 15. The imaging apparatus 1D includes a processor 30D and monitors 14A and 14B. In the operation mode MODE2, the monitor 14A performs display on the basis of the image signal SA2, and the monitor 14B performs display on the basis of the image signal SB2. This configuration allows the user to confirm the display image corresponding to the entire image PA on the monitor 14A, and to confirm the display image corresponding to the detailed image PB on the monitor 14B.

Modification Example 1-5

In the above-described embodiment, the processor 30 includes the integrated circuit of one chip; however, the configuration is not limited thereto. Alternatively, for example, all or a portion of the blocks of the processor 30 may be integrated in the image sensor. Specifically, for example, as with an imaging apparatus 1E illustrated in FIG. 16, the image separator 32 and the AF calculator 33 may be integrated in an image sensor 20E. The imaging apparatus 1E includes the image sensor 20E and a processor 30E. The image sensor 20E generates the image signals SA and SB, and the processor 30E performs processing on the basis of the image signals SA and SB. Note that the configuration is not limited thereto, and for example, the WB calculator 34 and the image processor 35 may be further integrated in the image sensor.

Modification Example 1-6

In the above-described embodiment, the image processor 35 performs the predetermined image processing on the basis of the image signal SA, and performs the predetermined image processing on the basis of the image signal SB. At this time, the image processor 35 may perform so-called blending processing on the entire image PA indicated by the image signal SA. In other words, since the image part inside the region RB and the image part outside the region RB in the entire image PA illustrated in FIGS. 6A and 6B are obtained through the operations different from each other as described above, the image near a boundary of the region RB may become unnatural. Accordingly, performing the blending processing on the entire image PA makes it possible to make unnaturalness of the image near the boundary of the region RB inconspicuous.

Modification Example 1-7

In the above-described embodiment, the controller 31 shifts the operation mode from the operation mode MODE1 to the operation mode MODE2 in response to the user operation, and sets the region RB; however, the operation is not limited thereto. Alternatively, the controller 31 may shift the operation mode in response to execution of predetermined processing by the processor 30, and set the region RB. Specifically, for example, in a case where the image processor 35 includes a function of performing face recognition processing, the controller 31 may shift the operation mode from the operation mode MODE1 to the operation mode MODE2 on the basis of recognition of a face, and set a recognized region where the face is present, as the region RB. Note that an object of the recognition processing is not limited to a face, and may be a vehicle, a number plate, etc. Here, the image processor 35 corresponds to a specific example of "image recognizer" in the disclosure. In a case of such recognition processing, as illustrated in FIG. 7, the image PB2 corresponding to the detailed image PB including a recognition object (e.g., face) may be displayed on the entire display screen of the monitor 14, and the image PA2 corresponding to the entire image PA may be displayed as picture-in-picture at the lower right part thereon. Further, for example, the picture-in-picture display may not be performed and the image PB2 corresponding to the detailed image PB including the recognition object may be displayed on the entire display screen of the monitor 14. Also in this case, enhancing uniformity of focal plane distortion makes it possible to enhance, for example, processing accuracy of the face recognition processing.

Modification Example 1-8

In the above-described embodiment, in the operation mode MODE2, one region RB is set; however, the number of regions RB is not limited thereto. Alternatively, for example, as illustrated in FIG. 17, a plurality of regions RB may be set. In this example, for example, an example in the case of performing the face recognition processing is illustrated. Two faces are recognized, and the controller 31 sets two regions RB1 and RB2. Further, as illustrated in FIGS. 18A and 18B, a detailed image relating to the region RB1 and a detailed image relating to the region RB2 may be enlarged and displayed on different monitors.

Modification Example 1-9

In the above-described embodiment, the case where the imaging apparatus 1 performs electronic zoom or manual focusing has been described as an example; however, application is not limited thereto. Alternatively, for example, it is applicable to a case where the image region to be focused is set to a narrow region such as a center spot and a flexible spot in a case of performing automatic focusing. In this case, the controller 31 sets the image region to be focused, as the region RB. Further, the AF calculator 33 performs the predetermined calculation on the basis of the detailed image PB relating to the region RB, thereby controlling the lens section 11. Note that, at this time, the image synthesizer 37 generates the display image PP corresponding to the entire image PA on the basis of the image signal SA2 without performing the image synthesizing processing.

Further, for example, it is applicable to a case where the image region in which the white balance is adjusted is narrowed, in a case of performing the white balance adjustment. In this case, the controller 31 sets the image region where the white balance is adjusted, as the region RB. Further, the WB calculator 34 performs the predetermined calculation on the basis of the detailed image PB relating to the region RB, to generate the signal S3 used for adjustment of the white balance. Note that, at this time, the image synthesizer 37 generates the display image PP corresponding to the entire image PA on the basis of the image signal SA2 without performing the image synthesizing processing.

Other Modification Examples

Moreover, two or more of these modification examples may be combined.

2. Second Embodiment

Next, an imaging apparatus 2 according to a second embodiment is described. In the present embodiment, a set of the transfer control line TGL, the reset control line RCL, and the output control line OCL is provided to each of the pixel lines. Note that components substantially same as those in the imaging apparatus 1 according to the above-described first embodiment are denoted by the same reference numerals, and description of such components is appropriately omitted.

As illustrated in FIG. 1, the imaging apparatus 2 includes an image sensor 70 and a processor 90.

FIG. 19 illustrates a configuration example of the image sensor 70. The image sensor 70 includes a pixel array 71, an imaging controller 72, a scanner 73, and a reader 80.

The pixel array 71 includes a plurality of pixels 9 that are arranged in a matrix. Further, the pixel array 71 includes a plurality of transfer control lines TGL extending in a horizontal direction (lateral direction in FIG. 19), a plurality of reset control lines RCL extending in the horizontal direction, a plurality of output control lines OCL extending in the horizontal direction, and a plurality of signal lines SGL extending in a perpendicular direction (vertical direction in FIG. 19). One end of each of the plurality of transfer control lines TGL, one end of each of the plurality of reset control lines RCL, and one end of each of the plurality of output control lines OCL are coupled to the scanner 73, and one end of each of the plurality of signal lines SGL is coupled to the reader 80.

FIG. 20 illustrates a configuration example of each of the pixels 9. Each of the pixels 9 includes the photodiode 41, the transistors 42 to 45, and the floating diffusion 49. In other words, each of the pixels 9 is configured by omitting the switches 46 to 48 from each of the pixels 8 (FIG. 3) according to the first embodiment. The gate of the transistor 42 is coupled to the corresponding transfer control line TGL. The gate of the transistor 43 is coupled to the corresponding reset control line RCL. The gate of the transistor 45 is coupled to the corresponding output control line OCL. A transfer control signal TG is supplied to the transfer control lines TGL from the scanner 73, a reset control signal RST is supplied to the reset control lines RCL from the scanner 73, and an output control signal OUT is supplied to the output control lines OCL from the scanner 73.

The imaging controller 72 (FIG. 19) supplies a control signal to each of the scanner 73 and the reader 80 on the basis of the image control signal S2, thereby controlling operation of the image sensor 70. The scanner 73 scans the plurality of pixels 9 of the pixel array 71 on the basis of the control signal supplied from the imaging controller 72.

The reader 80 generates the image signal Spic including captured image data, on the basis of the control signal supplied from the imaging controller 72 and the signal SIG supplied through the signal lines SGL.

FIG. 21 illustrates a configuration example of the reader 80. In this figure, the imaging controller 72 is also illustrated in addition to the reader 80. The reader 80 includes a signal generator 81, a plurality of AD converters 100, and a reading controller 83.

The signal generator 81 generates a reference signal REF, a clock signal CLK, and a control signal CC on the basis of a control signal supplied from the reading controller 83. Specifically, the signal generator 81 selectively generates one of two reference signals (reference signals REF1 and REF2 in first embodiment described above) different in gradient of the ramp waveform, on the basis of the control signal supplied from the reading controller 53, and outputs the generated signal as the reference signal REF. Likewise, the signal generator 81 selectively generates one of two clock signals (clock signals CLK1 and CLK2 in first embodiment described above) different in frequency, on the basis of the control signal supplied from the reading controller 83, and outputs the generated signal as the clock signal CLK. Further, the signal generator 81 selectively generates one of two control signals (control signals CC1 and CC2 in first embodiment described above) on the basis of the control signal supplied from the reading controller 83, and outputs the generated signal as the control signal CC.

Each of the AD converters 100 performs the AD conversion on the basis of the signal SIG (voltage Vreset and voltage Vsig) supplied from the pixel array 71. Each of the AD converters 100 includes the comparator 62 and the counter 65. In other words, each of the AD converters 100 is obtained by omitting the switches 61, 63, and 64 from each of the AD converters 60 (FIG. 4) according to the first embodiment.

The reading controller 83 supplies the control signal to the signal generator 81 in response to an instruction from the imaging controller 72, thereby controlling operation of the signal generator 81.

As illustrated in FIG. 1, the processor 90 includes a controller 91 and an image separator 92.

The controller 91 controls operation of the imaging apparatus 2. The imaging apparatus 2 includes the two operation modes MODE1 and MODE2, as with the imaging apparatus 1 according to the above-described embodiment. The controller 91 performs operation in the operation mode MODE2, for example, in a case where the imaging apparatus 2 performs electronic zoom or manual focusing, as with the controller 31 according to the above-described embodiment. Specifically, for example, in the case of performing electronic zoom, the controller 91 sets, as the region RB, a region where the electronic zoom is desirably performed. Further, the controller 91 sets a region RC including a plurality of pixel lines corresponding to the region RB on the basis of the set region RB.

FIG. 22 schematically illustrates an imaging operation state in the imaging-possible region RA in which the image sensor 70 is able to image. In this example, in the image sensor 70, all of the pixels 9 perform the imaging operation in the region RC including the plurality of pixel lines corresponding to the region RB. Further, in the image sensor 70, thinning scanning is performed at a rate of one line per two lines in a region other than the region RC. As a result, the pixels 9 included in odd lines perform the imaging operation in this example.

The controller 91 supplies the imaging control signal S2 to the image sensor 70, thereby controlling the image sensor 70 to perform the imaging operation as illustrated in FIG. 22.

The image separator 92 generates the entire image PA and the detailed image PB illustrated in FIGS. 6A and 6B on the basis of the image signal Spic in the case where the image sensor 70 performs the imaging operation as illustrated in FIG. 22. In other words, the image separator 92 generates the entire image PA on the basis of the data, included in the image signal Spic, relating to the pixels 9 included in the odd lines of the imaging-possible region RA, and generates the detailed image PB on the basis of the data, included in the image signal Spic, relating to all of the pixels 9 in the region RB.

Further, for example, in the case of performing electronic zoom or manual focusing in response to user operation, the controller 91 shifts the operation mode from the operation mode MODE1 to the operation mode MODE2. The case where the image sensor 70 performs the operation illustrated in FIG. 22 in the operation mode MODE2 is described in detail below.

FIG. 23 illustrates an example of scanning to the plurality of pixels 9 included in a column COL 3 illustrated in FIG. 22. In the image sensor 70, all of the pixels 9 in the region RC sequentially start the accumulation operation M1 in order from top. At this time, the pixels 9 in the region RC sequentially start the accumulation operation M1 with a time interval of half ($\Delta t/2$) of the time $\Delta t$. Further, after these pixels 9 perform the accumulation operation M1 for a predetermined time, the reader 80 performs the reading operation M2 sequentially on these pixels 9. At this time, in the imaging apparatus 2, a length of a period in which the reading operation M2 is performed on the pixels 9 inside the region RC is set to half of a length of a period in which the reading operation M2 is performed on the pixels 9 outside the region RC, as with the case of the imaging apparatus 1 (FIG. 9) according to the first embodiment. As a result, in the imaging apparatus 2, it is possible to enhance uniformity of focal plane distortion, and to enhance image quality of the captured image.

Next, the reading operation M2 to two pixels 9C and 9D inside the region RC is described in comparison with the reading operation M2 to a pixel 9B outside the region RC. As illustrated in FIG. 22, the pixel 9B is the pixel 9 included in k-th pixel line of the column COL3. The pixel 9C is the pixel 9 included in n-th pixel line of the column COL3, and the pixel 9D is the pixel 9 included in (n+1)-th pixel line of the column COL3.

FIGS. 24A, 24B, 24C, 24D, 24E, 24F, and 24G illustrate an example of operation to the pixel 9B, where FIG. 24A illustrates a waveform of the reset control signal RST(k) corresponding to k-th pixel line, FIG. 24B illustrates a waveform of the transfer control signal TG(k) corresponding to k-th pixel line, FIG. 24C illustrates a waveform of the output control signal OUT(k) corresponding to k-th pixel line, FIG. 24D illustrates a waveform of the reference signal REF, FIG. 24E illustrates a waveform of the signal SIG, FIG. 24F illustrates a waveform of the comparison signal CMP, and FIG. 24G illustrates a waveform of the clock signal CLK.

The pixel 9B performs the reset operation, the output of the voltage Vreset, the transfer operation, and the output of the voltage Vsig on the basis of the reset control signal RST(k), the transfer control signal TG(k), and the output control signal OUT(k) in a period from timing t21 to timing t22. Since the pixel 9B is the pixel 9 outside the region RC, the signal generator 81 reduces the gradient of the ramp waveform of the reference signal REF, and reduces the frequency of the clock signal CLK. Further, the corresponding AD converter 100 uses such reference signal REF and clock signal CLK to perform the AD conversion.

FIGS. 24H, 24I, 24J, 24K, 24L, 24M, 24N, 24O, 24P, and 24Q illustrate an example of operation to the two pixels 9C and 9D, where FIG. 24H illustrates a waveform of the reset control signal RST(n) corresponding to n-th pixel line, FIG. 24I illustrates a waveform of the transfer control signal TG(n) corresponding to n-th pixel line, FIG. 24J illustrates a waveform of the output control signal OUT(n) corresponding to n-th pixel line, FIG. 24K illustrates a waveform of the reset control signal RST(n+1) corresponding to (n+1)-th pixel line, FIG. 24L illustrates a waveform of the transfer control signal TG(n+1) corresponding to (n+1)-th pixel line, FIG. 24M illustrates a waveform of the output control signal OUT(n+1) corresponding to (n+1)-th pixel line, FIG. 24N illustrates a waveform of the reference signal REF, FIG. 24O illustrates a waveform of the signal SIG, FIG. 24P illustrates a waveform of the comparison signal CMP, and FIG. 24Q illustrates a waveform of the clock signal CLK.

The pixel 9C performs the reset operation, the output of the voltage Vreset, the transfer operation, and the output of the voltage Vsig on the basis of the reset control signal RST(n), the transfer control signal TG(n), and the output control signal OUT(n) in a period from timing t23 to timing t24. Likewise, the pixel 9D performs the reset operation, the output of the voltage Vreset, the transfer operation, and the output of the voltage Vsig on the basis of the reset control signal RST(n+1), the transfer control signal TG(n+1), and the output control signal OUT(n+1) in a subsequent period from timing t24 to timing t25. Since the pixels 9C and 9D are the pixels 9 inside the region RC, the signal generator 81 increases the gradient of the ramp waveform of the reference signal REF, and increases the frequency of the clock signal CLK. Further, the corresponding AD converter 100 uses such reference signal REF and clock signal CLK to perform the AD conversion. As a result, in the image sensor 70, it is possible to reduce the length of the period in which the reading operation M2 is performed on the pixels 9 inside the region RC to half of the length of the period in which the reading operation M2 is performed on the pixels 9 outside the region RC, as illustrated in FIG. 23. As a result, in the imaging apparatus 2, as illustrated by characteristics W4 in FIG. 23, the timings at which the accumulation operation M1 is performed are arranged in one straight line, which makes it possible to enhance uniformity of focal plane distortion and to enhance image quality of the captured image.

As described above, in the present embodiment, the length of the period in which the reading operation is performed on the pixels inside the region RB is reduced to half of the length of the period in which the reading operation is performed on the pixels outside the region RB. This makes it possible to enhance uniformity of focal plane distortion and to enhance image quality of the captured image.

In the present embodiment, since a set of the transfer control line, the reset control line, and the output control line is provided to each of the pixel lines, it is possible to simplify the configuration.

3. Application Examples

Next, application examples of the imaging apparatuses respectively described in the embodiments and the modifications described above are described.

FIG. 25 illustrates an appearance of a video camera to which any of the imaging apparatuses of the above-described embodiments, etc. is applied. The video camera includes, for example, a main body section 610, a lens 620, a start/stop switch 630, and a display 640. Any of the imaging apparatuses of the above-described embodiment, etc. is applied to the video camera.

The imaging apparatuses of the above-described embodiment, etc. are applicable to electronic equipment in various field, for example, a digital camera and a mobile terminal device such as a mobile phone, in addition to such a video camera. The imaging apparatuses are applicable to, for example, a monitoring camera that monitors a person and a vehicle. Moreover, the imaging apparatuses may be applied to an on-vehicle camera.

Hereinbefore, the technology has been described with reference to some embodiments, modifications, and application examples thereof; however, the technology is not limited to these embodiments, etc., and may be variously modified.

For example, in the above-described embodiments, the imaging apparatuses 1 and 2 image a moving image; however, the imaging is not limited thereto. For example, the imaging apparatuses 1 and 2 may image a still image or consecutive images. In addition, the imaging apparatuses 1 and 2 may image a so-called time lapse image.

Further, for example, in the above-described embodiments, the pixels included in one column share one AD converter; however, the configuration is not limited thereto. Alternatively, for example, the imaging-possible region may be segmented into a plurality of regions, and the pixels included in one region may share one AD converter.

Note that the effects described in the present specification are illustrative and non-limiting, and other effects may be achieved.

It is to be noted that the technology may have the following configurations.

(1)
An imaging control unit, including:
a first converter that performs analog-digital conversion operation in a first conversion period on the basis of a pixel signal supplied from a first pixel included in a first region of an imaging section;
a second converter that performs the analog-digital conversion operation in a second conversion period on the basis of a pixel signal supplied from a second pixel included in a second region that is different from the first region, of the imaging section; and
a controller that controls a time length of the first conversion period to become shorter than a time length of the second conversion period.

(2)
The imaging control unit according to (1), further including a scanner that is able to perform thinning scanning to scan a plurality of pixels included in the second region while thinning pixels.

(3)
The imaging control unit according to (2), in which the controller controls the time length of the first conversion period to become shorter than the time length of the second conversion period, according to the thinning scanning performed on the plurality of pixels included in the second region.

(4)
The imaging control unit according to (2) or (3), in which
the scanner further performs scanning on a plurality of pixels included in the first region, and a proportion of pixels to be scanned in the plurality of pixels included in the first region is higher than a proportion of pixels to be scanned in the plurality of pixels included in the second region.

(5)

The imaging control unit according to any one of (2) to (4), in which the controller controls the time length of the first conversion period to become shorter than the time length of the second conversion period, according to the ratio of the pixels to be scanned in the pixels included in the second region.

(6)

The imaging control unit according to any one of (1) to (5), further including an image generator that generates an image to be displayed on a display on the basis of an image obtained from the first region and an image obtained by reducing an image obtained from an imaging-possible region of the imaging section.

(7)

The imaging control unit according to any one of (1) to (6), in which the controller sets the first region on the basis of a recognition result of an image recognizer that recognizes an object.

(8)

The imaging control unit according to any one of (1) to (7), in which the first converter further performs the analog-digital conversion operation in a third conversion period on the basis of a pixel signal supplied from a third pixel included in a third region that is different from the first region, and the controller controls the time length of the first conversion period to become shorter than a time length of the third conversion period.

(9)

The imaging control unit according to any one of (1) to (8), in which the first converter converts the pixel signal supplied from the first pixel, into a first pixel time having a length corresponding to a signal level of the pixel signal, and performs the analog-digital conversion operation on the basis of the length of the first pixel time, in the first conversion period, and the second converter converts the pixel signal supplied from the second pixel, into a second pixel time having a length corresponding to a signal level of the pixel signal, and performs the analog-digital conversion operation on the basis of the length of the second pixel time, in the second conversion period.

(10)

The imaging control unit according to (9), in which the first converter includes a first comparator that generates a first comparison signal, and detects the length of the first pixel time on the basis of the first comparison signal, the first comparator generating the first comparison signal by comparing the pixel signal supplied from the first pixel and a first reference signal that is sequentially varied in signal level in the first conversion period, the second converter includes a second comparator that generates a second comparison signal, and detects the length of the second pixel time on the basis of the second comparison signal, the second comparator generating the second comparison signal by comparing the pixel signal supplied from the second pixel and a second reference signal that is sequentially varied in signal level in the second conversion period, and the controller further controls a variation degree of the signal level of the first reference signal to become larger than a variation degree of the signal level of the second reference signal.

(11)

The imaging control unit according to (10), in which the first converter further includes a first counter that counts a number of pulses of a first clock signal to detect the length of the first pixel time on the basis of the first comparison signal, the second converter further includes a second counter that counts a number of pulses of a second clock signal to detect the length of the second pixel time on the basis of the second comparison signal, and the controller further controls a frequency of the first clock signal to become higher than a frequency of the second clock signal.

(12)

An imaging apparatus, including:

an imaging section including a plurality of pixels;

a first analog-digital converter that performs conversion operation in a first conversion period on the basis of a pixel signal supplied from a first pixel included in a first region of the imaging section;

a second analog-digital converter that performs conversion operation in a second conversion period on the basis of a pixel signal supplied from a second pixel included in a second region that is different from the first region, of the imaging section; and a controller that controls a time length of the first conversion period to become shorter than a time length of the second conversion period.

(13)

The imaging apparatus according to (12), further including a scanner that supplies a plurality of sets of scan signals to each of the plurality of pixels to scan the plurality of pixels, in which each of the pixels generates the pixel signal on the basis of one set of scan signals out of the plurality of sets of scan signals, and the controller selects the one set of scan signals from the plurality of sets of scan signals.

(14)

An imaging control method, comprising:

performing analog-digital conversion operation in a first conversion period on the basis of a pixel signal supplied from a first pixel included in a first region of an imaging section;

performing the analog-digital conversion operation in a second conversion period on the basis of a pixel signal supplied from a second pixel included in a second region that is different from the first region, of the imaging section; and controlling a time length of the first conversion period to become shorter than a time length of the second conversion period.

This application is based upon and claims the benefit of priority of the Japanese Patent Application No. 2016-039867 filed with the Japan Patent Office on Mar. 2, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging control unit, comprising:
   a first converter configured to execute analog-digital conversion operation in a first conversion period based on a first pixel signal supplied from a first pixel in a first region of an imaging section;
   a second converter configured to execute the analog-digital conversion operation in a second conversion period based on a second pixel signal supplied from a second pixel in a second region of the imaging section, wherein the first region is different from the second region; and
   a controller configured to switch an operation mode of the imaging control unit to a specific mode, based on a face recognition operation executed on an image obtained from the imaging section,
      wherein, in the specific mode, a time length of the first conversion period is shorter than a time length of the second conversion period.

2. The imaging control unit according to claim 1, further comprising a scanner configured to execute a thinning scanning operation on a plurality of pixels included in the second region.

3. The imaging control unit according to claim 2, wherein the controller is further configured to control the time length of the first conversion period such that the time length of the first conversion period is shorter than the time length of the second conversion period, based on the execution of the thinning scanning operation on the plurality of pixels included in the second region.

4. The imaging control unit according to claim 2, wherein
   the scanner is further configured to execute a scanning operation on a plurality of pixels in the first region, and
   a first proportion of pixels scanned in the plurality of pixels in the first region, is higher than a second proportion of pixels scanned in the plurality of pixels in the second region.

5. The imaging control unit according to claim 4, wherein the controller is further configured to control the time length of the first conversion period such that the time length of the first conversion period is shorter than the time length of the second conversion period, based on the second proportion of pixels scanned in the plurality of pixels in the second region.

6. The imaging control unit according to claim 1, further comprising
   an image generator configured to generate a first image based on a second image and a third image, wherein
      the second image is obtained from the first region,
      the third image is obtained based on a reduction of a fourth image, and
      the fourth image is obtained from an imaging-possible region of the imaging section; and
   the controller is further configured to display the first image on a display.

7. The imaging control unit according to claim 1, wherein the controller is further configured to set the first region based on a recognition result of an image recognizer that recognizes an object.

8. The imaging control unit according to claim 1, wherein
   the first converter is further configured to execute the analog-digital conversion operation in a third conversion period based on a third pixel signal supplied from a third pixel in a third region that is different from the first region, and
   the controller is further configured to control the time length of the first conversion period such that the time length of the first conversion period is shorter than a time length of the third conversion period.

9. The imaging control unit according to claim 1, wherein the first converter is further configured to:
   convert the first pixel signal supplied from the first pixel, into a first pixel time having a length corresponding to a signal level of the first pixel signal; and
   execute the analog-digital conversion operation based on the length of the first pixel time, in the first conversion period, and
   the second converter is further configured to:
   convert the second pixel signal supplied from the second pixel, into a second pixel time having a length corresponding to a signal level of the second pixel signal; and
   execute the analog-digital conversion operation based on the length of the second pixel time, in the second conversion period.

10. The imaging control unit according to claim 9, wherein
    the first converter includes a first comparator, wherein the first comparator is configured to:
    generate a first comparison signal; and
    detect the length of the first pixel time based on the first comparison signal,
       wherein the first comparison signal is generated based on a comparison of the first pixel signal supplied from the first pixel and a first reference signal that is sequentially varied in signal level in the first conversion period;
    the second converter includes a second comparator, wherein the second comparator is configured to:
    generate a second comparison signal; and
    detect the length of the second pixel time based on the second comparison signal,
       wherein the second comparison signal is generated based on a comparison of the second pixel signal supplied from the second pixel and a second reference signal that is sequentially varied in signal level in the second conversion period; and
    the controller is further configured to control a variation degree of the signal level of the first reference signal such that the variation degree of the signal level of the first reference signal is larger than a variation degree of the signal level of the second reference signal.

11. The imaging control unit according to claim 10, wherein
    the first converter further includes a first counter configured to:
    count a first number of pulses of a first clock signal; and
    detect the length of the first pixel time based on the first comparison signal,
    the second converter further includes a second counter configured to:
    count a second number of pulses of a second clock signal; and
    detect the length of the second pixel time based on the second comparison signal, and
    the controller is further configured to control a frequency of the first clock signal such that the frequency of the first clock signal is higher than a frequency of the second clock signal.

12. An imaging apparatus, comprising:
    an imaging section including a plurality of pixels;
    a first analog-digital converter configured to execute conversion operation in a first conversion period based on a first pixel signal supplied from a first pixel in a first region of the imaging section;

a second analog-digital converter configured to execute the conversion operation in a second conversion period based on a second pixel signal supplied from a second pixel in a second region of the imaging section, wherein the first region is different from the second region; and a controller configured to switch an operation mode of the imaging apparatus to a specific mode, based on a face recognition operation executed on an image obtained by the imaging section, wherein, in the specific mode, a time length of the first conversion period is shorter than a time length of the second conversion period.

13. The imaging apparatus according to claim 12, further comprising a scanner configured to supply a plurality of sets of scan signals to each of the plurality of pixels to scan the plurality of pixels, wherein each of the plurality of pixels generates a pixel signal based on one set of scan signals out of the plurality of sets of scan signals, and the controller is further configured to select the one set of scan signals from the plurality of sets of scan signals.

14. An imaging control method, comprising:

executing analog-digital conversion operation in a first conversion period based on a first pixel signal supplied from a first pixel in a first region of an imaging section;

executing the analog-digital conversion operation in a second conversion period based on a second pixel signal supplied from a second pixel in a second region of the imaging section, wherein the first region is different from the second region; and switching an operation mode of an imaging control unit to a specific mode, based on a face recognition operation executed on an image obtained from the imaging section, wherein, in the specific mode, a time length of the first conversion period is shorter than a time length of the second conversion period.

* * * * *